US009928146B2

United States Patent
Nallathambi et al.

(10) Patent No.: US 9,928,146 B2
(45) Date of Patent: *Mar. 27, 2018

(54) DATA STORAGE SYSTEM UTILIZING PROXY DEVICE FOR STORAGE OPERATIONS

(71) Applicant: CommVault Systems, Inc., Tinton Falls, NJ (US)

(72) Inventors: Vimal Kumar Nallathambi, Ocean Township, NJ (US); Manoj Kumar Vijayan, Marlboro, NJ (US)

(73) Assignee: CommVault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/266,333

(22) Filed: Sep. 15, 2016

(65) Prior Publication Data
US 2017/0068601 A1 Mar. 9, 2017

Related U.S. Application Data

(63) Continuation of application No. 14/134,440, filed on Dec. 19, 2013, now Pat. No. 9,471,578, which is a
(Continued)

(51) Int. Cl.
*G06F 17/00* (2006.01)
*G06F 11/14* (2006.01)
(Continued)

(52) U.S. Cl.
CPC ...... *G06F 11/1451* (2013.01); *G06F 11/1464* (2013.01); *G06F 17/30088* (2013.01);
(Continued)

(58) Field of Classification Search
CPC ......... G06F 17/30091; G06F 17/30156; G06F 17/30312; G06F 11/1446; G06F 11/1453; G06F 11/1469; G06F 2201/84
(Continued)

(56) References Cited

U.S. PATENT DOCUMENTS 4,296,465 A 10/1981 Lemak
4,686,620 A 8/1987 Ng
(Continued)

FOREIGN PATENT DOCUMENTS

| AU | 2006331932 | 12/2006 |
| CA | 2632935 | 12/2006 |

(Continued)

OTHER PUBLICATIONS

Armstead et al., "Implementation of a Campus-Wide Distributed Mass Storage Service: The Dream vs. Reality," IEEE, 1995, pp. 190-199.
(Continued)

*Primary Examiner* — Dung K Chau
(74) *Attorney, Agent, or Firm* — Knobbe, Martens, Olson & Bear, LLP

(57) ABSTRACT

A data storage environment can include a secondary storage computing device that acts as a proxy for other secondary storage computing devices. For example, the secondary storage computing device receives a storage operation request from one or more of the other secondary storage computing devices, such as a request to create a snapshot of client data. The secondary storage computing device generally acts as an intermediary between the other secondary storage computing devices and the storage device to carry out the snapshots or other storage operations. The secondary storage computing device may further receive a notification upon completion of the storage operations, and transmit
(Continued)

relevant data to the requesting secondary storage computing device regarding the storage operation.

13 Claims, 17 Drawing Sheets

Related U.S. Application Data continuation-in-part of application No. 13/787,609, filed on Mar. 6, 2013, now Pat. No. 9,298,715.

(60) Provisional application No. 61/740,370, filed on Dec. 20, 2012, provisional application No. 61/607,728, filed on Mar. 7, 2012.

(51) Int. Cl.
  *G06F 17/30* (2006.01)
  *G06F 21/44* (2013.01)

(52) U.S. Cl.
  CPC ........ *G06F 17/30091* (2013.01); *G06F 21/44* (2013.01); *G06F 17/30156* (2013.01); *G06F 17/30312* (2013.01); *G06F 2201/84* (2013.01)

(58) Field of Classification Search
  USPC ................ 707/649, 640, 692, 705, 736, 822
  See application file for complete search history.

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi et al. |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,604,862 A | 2/1997 | Midgely et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitsky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,819,292 A | 10/1998 | Hitz et al. |
| 5,829,046 A | 10/1998 | Tzelnic et al. |
| 5,835,953 A | 11/1998 | Ohran |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,938,135 A | 8/1999 | Sasaki et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,061,692 A | 5/2000 | Thomas et al. |
| 6,072,490 A | 6/2000 | Bates et al. |
| 6,076,148 A | 6/2000 | Kedem et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A | 12/2000 | Tibbetts |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome et al. |
| 6,212,512 B1 | 4/2001 | Barney et al. |
| 6,212,521 B1 | 4/2001 | Minami et al. |

(56) References Cited

U.S. PATENT DOCUMENTS

| | | |
|---|---|---|
| 6,230,164 B1 | 5/2001 | Rikieta et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek et al. |
| 6,418,478 B1 | 7/2002 | Ignatius et al. |
| 6,421,711 B1 | 7/2002 | Blumenau et al. |
| 6,434,681 B1 | 8/2002 | Armangau |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,909 B1 | 4/2003 | Tamer et al. |
| 6,542,972 B2 | 4/2003 | Ignatius et al. |
| 6,557,089 B1 | 4/2003 | Reed et al. |
| 6,564,228 B1 | 5/2003 | O'Connor |
| 6,581,143 B2 | 6/2003 | Gagne et al. |
| 6,594,744 B1 | 7/2003 | Humlicek et al. |
| 6,604,118 B2 | 8/2003 | Kleinman et al. |
| 6,604,149 B1 | 8/2003 | Deo et al. |
| 6,606,690 B2 | 8/2003 | Padovano |
| 6,615,223 B1 | 9/2003 | Shih et al. |
| 6,631,477 B1 | 10/2003 | LeCrone et al. |
| 6,631,493 B2 | 10/2003 | Ottesen et al. |
| 6,643,671 B2 | 11/2003 | Milillo et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,721,767 B2 | 4/2004 | De Meno et al. |
| 6,728,733 B2 | 4/2004 | Tokui |
| 6,728,736 B2 | 4/2004 | Hostetter et al. |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,518 B2 | 9/2004 | Armangau et al. |
| 6,799,258 B1 | 9/2004 | Linde |
| 6,836,779 B2 | 12/2004 | Poulin |
| 6,871,163 B2 | 3/2005 | Hiller et al. |
| 6,871,271 B2 | 3/2005 | Ohran et al. |
| 6,877,016 B1 | 4/2005 | Hart et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,898,688 B2 | 5/2005 | Martin et al. |
| 6,912,482 B2 | 6/2005 | Kaiser |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,948,038 B2 | 9/2005 | Berkowitz et al. |
| 6,948,089 B2 | 9/2005 | Fujibayashi |
| 6,952,705 B2 | 10/2005 | Knoblock et al. |
| 6,952,758 B2 | 10/2005 | Chron et al. |
| 6,954,834 B2 | 10/2005 | Slater et al. |
| 6,957,362 B2 | 10/2005 | Armangau |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,032,131 B2 | 4/2006 | Lubbers et al. |
| 7,035,880 B1 | 4/2006 | Crescenti et al. |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,072,915 B2 | 7/2006 | Kaczmarski et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,096,315 B2 | 8/2006 | Takeda et al. |
| 7,100,089 B1 | 8/2006 | Phelps |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,111,026 B2 | 9/2006 | Sato |
| 7,120,757 B2 | 10/2006 | Tsuge |
| 7,130,860 B2 | 10/2006 | Pachet |
| 7,130,970 B2 | 10/2006 | Devassy et al. |
| 7,139,887 B2 | 11/2006 | Colgrove et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,165,079 B1 | 1/2007 | Chen et al. |
| 7,174,352 B2 | 2/2007 | Kleinman et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,197,665 B2 | 3/2007 | Goldstein et al. |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,228,456 B2 | 6/2007 | Lecrone et al. |
| 7,231,544 B2 | 6/2007 | Tan et al. |
| 7,234,115 B1 | 6/2007 | Sprauve et al. |
| 7,237,075 B2 | 6/2007 | Welsh et al. |
| 7,246,140 B2 | 7/2007 | Therrien et al. |
| 7,246,207 B2* | 7/2007 | Kottomtharayil et al. |
| 7,251,713 B1* | 7/2007 | Zhang ............... G06F 11/1466 709/227 |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Amangau et al. |
| 7,275,277 B2 | 10/2007 | Moskovich et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |

(56) References Cited

U.S. PATENT DOCUMENTS

| | | |
|---|---|---|
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,370,232 B2 | 5/2008 | Safford |
| 7,373,364 B1 | 5/2008 | Chapman |
| 7,380,072 B2 | 5/2008 | Kottomtharayil et al. |
| 7,383,538 B2 | 6/2008 | Bates et al. |
| 7,389,311 B1 | 6/2008 | Crescenti et al. |
| 7,392,360 B1 | 6/2008 | Aharoni et al. |
| 7,395,282 B1 | 7/2008 | Crescenti et al. |
| 7,395,387 B2 | 7/2008 | Berkowitz et al. |
| 7,409,509 B2 | 8/2008 | Devassy et al. |
| 7,412,583 B2 | 8/2008 | Burton et al. |
| 7,415,488 B1 | 8/2008 | Muth et al. |
| 7,421,554 B2 | 9/2008 | Colgrove et al. |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,467,167 B2 | 12/2008 | Patterson |
| 7,467,267 B1 | 12/2008 | Mayock |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,519,726 B2 | 4/2009 | Palliyll et al. |
| 7,523,276 B1 | 4/2009 | Shankar |
| 7,523,483 B2 | 4/2009 | Dogan |
| 7,529,748 B2 | 5/2009 | Wen et al. |
| 7,529,782 B2 | 5/2009 | Prahlad et al. |
| 7,529,898 B2 | 5/2009 | Nguyen et al. |
| 7,532,340 B2 | 5/2009 | Koppich et al. |
| 7,536,291 B1 | 5/2009 | Vijayan Retnamma et al. |
| 7,539,707 B2 | 5/2009 | Prahlad et al. |
| 7,543,125 B2 | 6/2009 | Gokhale |
| 7,546,324 B2 | 6/2009 | Prahlad et al. |
| 7,565,572 B2 | 7/2009 | Yamasaki |
| 7,567,991 B2 | 7/2009 | Armangau et al. |
| 7,568,080 B2 | 7/2009 | Prahlad et al. |
| 7,577,806 B2 | 8/2009 | Rowan |
| 7,581,077 B2 | 8/2009 | Ignatius et al. |
| 7,587,563 B1 | 9/2009 | Teterin et al. |
| 7,596,586 B2 | 9/2009 | Gokhale et al. |
| 7,606,841 B1 | 10/2009 | Ranade |
| 7,606,844 B2 | 10/2009 | Kottomtharayil |
| 7,606,868 B1 | 10/2009 | Le et al. |
| 7,610,387 B1 | 10/2009 | Liskov et al. |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,541 B2 | 11/2009 | Plotkin et al. |
| 7,620,666 B1 | 11/2009 | Root et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,664,771 B2 | 2/2010 | Kusters et al. |
| 7,668,798 B2 | 2/2010 | Scanlon et al. |
| 7,669,029 B1 | 2/2010 | Mishra et al. |
| 7,672,979 B1 | 3/2010 | Appellof et al. |
| 7,685,126 B2 | 3/2010 | Patel et al. |
| 7,689,467 B1 | 3/2010 | Belanger et al. |
| 7,702,533 B2 | 4/2010 | Barnard et al. |
| 7,707,184 B1 | 4/2010 | Zhang et al. |
| 7,716,171 B2 | 5/2010 | Kryger |
| 7,734,578 B2 | 6/2010 | Prahlad et al. |
| 7,734,715 B2 | 6/2010 | Hyakutake et al. |
| 7,739,235 B2 | 6/2010 | Rousseau et al. |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,533 B2 | 11/2010 | Prahlad et al. |
| 7,840,537 B2 | 11/2010 | Gokhale et al. |
| 7,844,577 B2 | 11/2010 | Becker et al. |
| 7,870,355 B2 | 1/2011 | Erofeev |
| 7,930,274 B2 | 4/2011 | Hwang et al. |
| 7,930,476 B1 | 4/2011 | Castelli et al. |
| 7,962,455 B2 | 6/2011 | Erofeev |
| 7,962,709 B2 | 6/2011 | Agrawal |
| 8,024,294 B2 | 9/2011 | Kottomtharayil |
| 8,046,334 B2 | 10/2011 | Hwang et al. |
| 8,060,695 B1 | 11/2011 | Lee et al. |
| 8,121,983 B2 | 2/2012 | Prahlad et al. |
| 8,166,263 B2 | 4/2012 | Prahlad |
| 8,190,565 B2 | 5/2012 | Prahlad et al. |
| 8,204,859 B2 | 6/2012 | Ngo |
| 8,205,049 B1* | 6/2012 | Armangau ............... G06F 13/28 711/162 |
| 8,219,524 B2 | 7/2012 | Gokhale |
| 8,245,128 B1* | 8/2012 | Ahad ................ G06F 17/30902 205/208 |
| 8,271,830 B2 | 9/2012 | Erofeev |
| 8,326,803 B1 | 12/2012 | Stringham |
| 8,346,727 B1 | 1/2013 | Chester et al. |
| 8,352,422 B2 | 1/2013 | Prahlad et al. |
| 8,463,751 B2 | 6/2013 | Kottomtharayil |
| 8,489,656 B2 | 7/2013 | Erofeev |
| 8,510,271 B1 | 8/2013 | Tsaur et al. |
| 8,521,694 B1 | 8/2013 | Natanzon |
| 8,645,320 B2 | 2/2014 | Prahlad et al. |
| 8,656,123 B2 | 2/2014 | Lee |
| 8,719,226 B1* | 5/2014 | Jiang ................ G06F 17/30309 707/638 |
| 8,725,694 B2 | 5/2014 | Kottomtharayil |
| 8,789,208 B1 | 7/2014 | Sundaram et al. |
| 8,856,079 B1 | 10/2014 | Subramanian et al. |
| 8,868,494 B2 | 10/2014 | Agrawal |
| 8,886,595 B2 | 11/2014 | Prahlad et al. |
| 8,930,497 B1 | 1/2015 | Holmes et al. |
| 9,002,785 B2 | 4/2015 | Prahlad et al. |
| 9,015,121 B1 | 4/2015 | Salamon et al. |
| 9,128,901 B1 | 9/2015 | Nickurak et al. |
| 9,208,160 B2 | 12/2015 | Prahlad et al. |
| 9,218,252 B1 | 12/2015 | Revur et al. |
| 9,239,840 B1* | 1/2016 | Acharya ............. G06F 17/3012 |
| 9,251,198 B2 | 2/2016 | Mutalik et al. |
| 9,298,715 B2 | 3/2016 | Kumarasamy et al. |
| 9,342,537 B2 | 5/2016 | Kumarasamy et al. |
| 9,405,631 B2 | 8/2016 | Prahlad et al. |
| 9,448,731 B2 | 9/2016 | Nallathambi et al. |
| 9,471,578 B2 | 10/2016 | Nallathambi et al. |
| 9,495,251 B2 | 11/2016 | Kottomtharayil et al. |
| 9,535,907 B1 | 1/2017 | Stringham |
| 9,619,341 B2 | 4/2017 | Prahlad et al. |
| 9,632,874 B2 | 4/2017 | Pawar et al. |
| 9,639,426 B2 | 5/2017 | Pawar et al. |
| 9,648,105 B2 | 5/2017 | Nallathambi et al. |
| 9,753,812 B2 | 9/2017 | Pawar et al. |
| 9,774,672 B2 | 9/2017 | Nallathambi et al. |
| 2001/0027457 A1 | 10/2001 | Yee |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0042222 A1 | 11/2001 | Kedem et al. |
| 2001/0044807 A1 | 11/2001 | Kleiman et al. |
| 2001/0044834 A1 | 11/2001 | Bradshaw et al. |
| 2002/0002557 A1 | 1/2002 | Straube et al. |
| 2002/0004883 A1 | 1/2002 | Nguyen et al. |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |

(56) References Cited

U.S. PATENT DOCUMENTS

| | | |
|---|---|---|
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0069324 A1 | 6/2002 | Gerasimov et al. |
| 2002/0073070 A1 | 6/2002 | Morita et al. |
| 2002/0083055 A1 | 6/2002 | Pachet et al. |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0133511 A1 | 9/2002 | Hostetter |
| 2002/0133512 A1 | 9/2002 | Milillo et al. |
| 2002/0143903 A1 | 10/2002 | Uratani et al. |
| 2002/0152381 A1 | 10/2002 | Kuriya et al. |
| 2002/0161753 A1 | 10/2002 | Inaba et al. |
| 2002/0174107 A1 | 11/2002 | Poulin |
| 2002/0174416 A1 | 11/2002 | Bates et al. |
| 2003/0018657 A1 | 1/2003 | Monday |
| 2003/0028736 A1 | 2/2003 | Berkowitz et al. |
| 2003/0061491 A1 | 3/2003 | Jaskiewicz et al. |
| 2003/0097296 A1 | 5/2003 | Putt |
| 2003/0131278 A1 | 7/2003 | Fujibayashi |
| 2003/0135783 A1 | 7/2003 | Martin et al. |
| 2003/0140070 A1 | 7/2003 | Kaczmarski et al. |
| 2003/0158834 A1 | 8/2003 | Sawdon et al. |
| 2003/0167380 A1 | 9/2003 | Green et al. |
| 2003/0177149 A1 | 9/2003 | Coombs |
| 2003/0177321 A1 | 9/2003 | Watanabe |
| 2003/0187847 A1 | 10/2003 | Lubbers et al. |
| 2003/0225800 A1 | 12/2003 | Kavuri |
| 2004/0002934 A1 | 1/2004 | Taulbee et al. |
| 2004/0010487 A1 | 1/2004 | Prahlad et al. |
| 2004/0015468 A1 | 1/2004 | Beier et al. |
| 2004/0039679 A1 | 2/2004 | Norton et al. |
| 2004/0098425 A1 | 5/2004 | Wiss et al. |
| 2004/0107199 A1 | 6/2004 | Dairymple, III et al. |
| 2004/0117572 A1 | 6/2004 | Welsh et al. |
| 2004/0139128 A1 | 7/2004 | Becker et al. |
| 2004/0143642 A1 | 7/2004 | Beckmann et al. |
| 2004/0148376 A1 | 7/2004 | Rangan et al. |
| 2004/0193953 A1 | 9/2004 | Callahan et al. |
| 2004/0205206 A1 | 10/2004 | Naik et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267835 A1 | 12/2004 | Zwilling et al. |
| 2004/0267836 A1 | 12/2004 | Amangau et al. |
| 2005/0005070 A1 | 1/2005 | Lam |
| 2005/0027748 A1 | 2/2005 | Kisley |
| 2005/0027892 A1 | 2/2005 | McCabe et al. |
| 2005/0033800 A1 | 2/2005 | Kavuri et al. |
| 2005/0033878 A1 | 2/2005 | Pangal et al. |
| 2005/0060598 A1 | 3/2005 | Klotz et al. |
| 2005/0066118 A1 | 3/2005 | Perry et al. |
| 2005/0066222 A1 | 3/2005 | Rowan et al. |
| 2005/0066225 A1 | 3/2005 | Rowan et al. |
| 2005/0080928 A1 | 4/2005 | Beverly et al. |
| 2005/0086241 A1 | 4/2005 | Ram et al. |
| 2005/0108292 A1 | 5/2005 | Burton et al. |
| 2005/0138306 A1 | 6/2005 | Panchbudhe et al. |
| 2005/0144202 A1 | 6/2005 | Chen |
| 2005/0187982 A1 | 8/2005 | Sato |
| 2005/0187992 A1 | 8/2005 | Prahlad et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0246376 A1 | 11/2005 | Lu et al. |
| 2005/0246510 A1 | 11/2005 | Retnamma et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0020616 A1 | 1/2006 | Hardy et al. |
| 2006/0034454 A1 | 2/2006 | Damgaard et al. |
| 2006/0047805 A1 | 3/2006 | Byrd et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0136771 A1 | 6/2006 | Watanabe |
| 2006/0242371 A1 | 10/2006 | Shono et al. |
| 2006/0242489 A1 | 10/2006 | Brockway et al. |
| 2007/0005915 A1 | 1/2007 | Thompson et al. |
| 2007/0006018 A1 | 1/2007 | Thompson et al. |
| 2007/0043956 A1 | 2/2007 | El Far et al. |
| 2007/0067263 A1 | 3/2007 | Husain et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0115738 A1 | 5/2007 | Emaru |
| 2007/0124347 A1 | 5/2007 | Vivian et al. |
| 2007/0124348 A1 | 5/2007 | Claborn et al. |
| 2007/0143371 A1 | 6/2007 | Kottomtharayil |
| 2007/0143756 A1 | 6/2007 | Gokhale |
| 2007/0174569 A1 | 7/2007 | Schnapp et al. |
| 2007/0179990 A1 | 8/2007 | Zimran et al. |
| 2007/0183224 A1 | 8/2007 | Erofeev |
| 2007/0185937 A1 | 8/2007 | Prahlad et al. |
| 2007/0185938 A1 | 8/2007 | Prahlad et al. |
| 2007/0185939 A1 | 8/2007 | Prahlad et al. |
| 2007/0185940 A1 | 8/2007 | Prahlad et al. |
| 2007/0186068 A1 | 8/2007 | Agrawal |
| 2007/0198602 A1 | 8/2007 | Ngo et al. |
| 2007/0226438 A1 | 9/2007 | Erofeev |
| 2007/0244571 A1 | 10/2007 | Wilson et al. |
| 2007/0283111 A1 | 12/2007 | Berkowitz et al. |
| 2007/0288536 A1 | 12/2007 | Sen et al. |
| 2007/0288711 A1 | 12/2007 | Chen et al. |
| 2008/0016293 A1 | 1/2008 | Saika |
| 2008/0028009 A1 | 1/2008 | Ngo |
| 2008/0059515 A1 | 3/2008 | Fulton |
| 2008/0103916 A1 | 5/2008 | Camarador et al. |
| 2008/0183775 A1 | 7/2008 | Prahlad et al. |
| 2008/0209146 A1 | 8/2008 | Imazu et al. |
| 2008/0229037 A1 | 9/2008 | Bunte et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244177 A1 | 10/2008 | Crescenti et al. |
| 2008/0244205 A1 | 10/2008 | Amano et al. |
| 2008/0306954 A1 | 12/2008 | Hornqvist |
| 2009/0044046 A1 | 2/2009 | Yamasaki |
| 2009/0070330 A1 | 3/2009 | Hwang et al. |
| 2009/0150462 A1 | 6/2009 | McClanahan et al. |
| 2009/0182963 A1 | 7/2009 | Prahlad et al. |
| 2009/0187944 A1 | 7/2009 | White et al. |
| 2009/0216816 A1 | 8/2009 | Basler et al. |
| 2009/0319534 A1 | 12/2009 | Gokhale |
| 2009/0319582 A1 | 12/2009 | Simek et al. |
| 2009/0319585 A1 | 12/2009 | Gokhale |
| 2010/0005259 A1 | 1/2010 | Prahlad |
| 2010/0011178 A1 | 1/2010 | Feathergill et al. |
| 2010/0036931 A1 | 2/2010 | Certain et al. |
| 2010/0049753 A1 | 2/2010 | Prahlad et al. |
| 2010/0070726 A1 | 3/2010 | Ngo et al. |
| 2010/0094808 A1 | 4/2010 | Erofeev |
| 2010/0100529 A1 | 4/2010 | Erofeev |
| 2010/0122053 A1* | 5/2010 | Prahlad ............ G06F 17/30212 711/162 |
| 2010/0131461 A1 | 5/2010 | Prahlad et al. |
| 2010/0145909 A1 | 6/2010 | Ngo |
| 2010/0153338 A1 | 6/2010 | Ngo et al. |
| 2010/0179941 A1 | 7/2010 | Agrawal et al. |
| 2010/0205150 A1 | 8/2010 | Prahlad et al. |
| 2010/0228919 A1 | 9/2010 | Stabrawa et al. |
| 2010/0250735 A1 | 9/2010 | Andersen |
| 2010/0257142 A1 | 10/2010 | Murphy et al. |
| 2010/0287141 A1 | 11/2010 | Prahlad et al. |
| 2011/0047195 A1* | 2/2011 | Le .................... G06F 17/30091 707/827 |
| 2011/0047340 A1 | 2/2011 | Olson et al. |

(56) References Cited

U.S. PATENT DOCUMENTS

| | | |
|---|---|---|
| 2011/0066599 A1 | 3/2011 | Prahlad et al. |
| 2011/0161299 A1 | 6/2011 | Prahlad et al. |
| 2011/0161300 A1 | 6/2011 | Hwang et al. |
| 2011/0196957 A1 | 8/2011 | Ayachitula et al. |
| 2011/0246416 A1 | 10/2011 | Prahlad et al. |
| 2011/0246429 A1 | 10/2011 | Prahlad et al. |
| 2011/0276594 A1 | 11/2011 | Chong et al. |
| 2011/0295804 A1 | 12/2011 | Erofeev |
| 2011/0295806 A1* | 12/2011 | Erofeev ............... H04L 29/0854 707/634 |
| 2012/0079221 A1 | 3/2012 | Sivasubramanian et al. |
| 2012/0084523 A1 | 4/2012 | Littlefield et al. |
| 2012/0131684 A1 | 5/2012 | Lynch |
| 2012/0179886 A1 | 7/2012 | Prahlad et al. |
| 2012/0317074 A1 | 12/2012 | Ngo |
| 2013/0006926 A1 | 1/2013 | Erofeev |
| 2013/0006938 A1 | 1/2013 | Prahlad et al. |
| 2013/0007183 A1 | 1/2013 | Sorenson et al. |
| 2013/0103650 A1 | 4/2013 | Natanzon et al. |
| 2013/0144881 A1 | 6/2013 | Sitsky et al. |
| 2013/0198311 A1 | 8/2013 | Tamir et al. |
| 2013/0218840 A1 | 8/2013 | Smith et al. |
| 2013/0262800 A1 | 10/2013 | Goodman et al. |
| 2013/0282953 A1 | 10/2013 | Orme et al. |
| 2014/0201150 A1 | 7/2014 | Kumarasamy et al. |
| 2014/0281317 A1 | 9/2014 | Garman et al. |
| 2015/0212893 A1 | 7/2015 | Pawar et al. |
| 2015/0212894 A1 | 7/2015 | Pawar et al. |
| 2015/0212895 A1 | 7/2015 | Pawar et al. |
| 2015/0212896 A1 | 7/2015 | Pawar et al. |
| 2015/0212897 A1 | 7/2015 | Kottomtharayil et al. |
| 2016/0062846 A1 | 3/2016 | Nallathambi et al. |
| 2016/0065671 A1 | 3/2016 | Nallathambi et al. |
| 2016/0142483 A1 | 5/2016 | Nallathambi et al. |
| 2016/0154707 A1 | 6/2016 | Kumarasamy et al. |
| 2016/0306712 A1 | 10/2016 | Nallathambi et al. |
| 2016/0306716 A1 | 10/2016 | Prahlad et al. |
| 2016/0334995 A1 | 11/2016 | Kumarasamy et al. |
| 2017/0083532 A1 | 3/2017 | Kottomtharayil et al. |
| 2017/0206141 A1 | 7/2017 | Nallathambi et al. |
| 2017/0206142 A1 | 7/2017 | Pawar et al. |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 2000-347811 | 12/2000 |
| WO | WO 1993/003549 | 2/1993 |
| WO | WO 1995/013580 | 5/1995 |
| WO | WO 1998/39707 | 9/1998 |
| WO | WO 1999/012098 | 3/1999 |
| WO | WO 1999/014692 | 3/1999 |
| WO | WO 2002/095632 | 11/2002 |
| WO | WO 2003/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2007/075587 | 7/2007 |

OTHER PUBLICATIONS

Arneson, "Development of Omniserver; Mass Storage Systems," Control Data Corporation, 1990, pp. 88-93.

Arneson, "Mass Storage Archiving in Network Environments" IEEE, 1998, pp. 45-50.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

"Easy snapshot backup and recovery is here." Copyright date listed 2014. 6 pages.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Gray (#1 of 2, pp. 646-655), Jim; Reuter, Andreas, Transaction Processing: Concepts and Techniques, Morgan Kaufmann Publisher, USA 1994, 1994, pp. 646-655.

Gray (#2 of 2, pp. 604-609), Jim; Reuter Andreas, Transaction Processing Concepts and Techniques, Morgan Kaufmann Publisher, USA 1994, pp. 604-609.

Harrington, Lisa H., "The RFP Process: How to Hire a Third Party", Transportation & Distribution, Sep. 1988, vol. 39, Issue 9, in 5 pages.

http://en.wikipedia.org/wiki/Naive_Bayes_classifier, printed on Jun. 1, 2010, in 7 pages.

IntelliSnap—Advanced Snapshots—NAS iDataAgent. <http://documentation.commvault.com/commvault/v10/article?p=products/nas ndmp/snap . . . > Retrieved Oct. 24, 2014. 14 pages.

Jander, "Launching Storage-Area Net," Data Communications, US, McGraw Hill, NY, vol. 27, No. 4(Mar. 21, 1998), pp. 64-72.

Kashyap, et al., "Professional Services Automation: A knowledge Management approach using LSI and Domain specific Ontologies", FLAIRS-01 Proceedings, 2001, pp. 300-302.

Lyon J., Design considerations in replicated database systems for disaster protection, COMPCON 1988, Feb. 29, 1988, pp. 428-430.

Microsoft Corporation, "Microsoft Exchange Server: Best Practices for Exchange Database Management," 1998.

Microsoft, "How Volume Shadow Copy Service Works", date listed Mar. 28, 2003.

Oltean, "VSS writers and inconsistent shadow copies", date listed Sep. 1, 2005, http://blogs.msdn.com/b/adioltean/archive/2005/08/31/ 458907.aspx.

Rosenblum et al., "The Design and Implementation of a Log-Structure File System," Operating Systems Review SIGOPS, vol. 25, No. 5, New York, US, pp. 1-15 (May 1991).

Simpana Intellisnap Snapshot Management Technology: Exponentially Accelerate Data Protection and Recovery. Copyright date listed 1999-2013. 2 pages.

Simpana Intellisnap Technology—Making Snaps Work. Copyright date listed 2014. 2 pages.

The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009.

Veritas Software Corporation, "Veritas Volume Manager 3.2, Administrator's Guide," Aug. 2001, 360 pages.

Wiesmann M, Database replication techniques: a three parameter classification, Oct. 16, 2000, pp. 206-215.

(56) References Cited

OTHER PUBLICATIONS

Examiner's Report for Australian Application No. 2003279847, Dated Dec. 9, 2008, 4 pages.
European Examination Report; Application No. 06848901.2, dated Apr. 1, 2009, pp. 7.
Examiner's First Report; Application No. 2006331932 dated May 11, 2011 in 2 pages.
Canadian Office Action dated Dec. 10, 2009, Application No. CA2544063.
Canadian Office Action dated Dec. 29, 2010, Application No. CA2546304.
First Office Action in Indian Application No. 3359/DELNP/2006 dated Feb. 11, 2013.
Final Office Action for Japanese Application No. 2003531581, dated Mar. 24, 2009, 6 pages.
First Office Action for Japanese Application No. 2003531581, dated Jul. 8, 2008, 8 pages.
International Preliminary Report on Patentability, PCT Application No. PCT/US2009/066880, dated Jun. 23, 2011, in 9 pages.
International Search Report and Written Opinion dated Jan. 11, 2006, PCT/US2004/038455.
International Search Report and Written Opinion dated Mar. 25, 2010, PCT/US2009/066880.
International Search Report and Written Opinion dated Nov. 13, 2009, PCT/US2007/081681.
International Search Report and Written Opinion issued in PCT Application No. PCT/US2011/030396, dated Jul. 18, 2011, in 20 pages.
International Search Report and Written Opinion issued in PCT Application No. PCT/US2011/38436, dated Sep. 21, 2011, in 18 pages.
International Search Report dated Dec. 28, 2009, PCT/US2004/038324.
International Search Report from International Application No. PCT/US2006/048273, dated May 15, 2007.
Second Examination Report in EU Appl. No. 06 848 901.2-2201 dated Dec. 3, 2010.
Li et al., "iROW: An Efficient Live Snapshot System for Virtual Machine Disk", ICPADS 2012, Singapore, Dec. 17-19, 2012, pp. 376-383.
Waldspurger, Carl, et al., I/O Virtualization, Communications of the ACM, vol. 55, No. 1, Jan. 2012, pp. 66-72.

* cited by examiner

DATA STORAGE SYSTEM UTILIZING PROXY DEVICE FOR STORAGE OPERATIONS

CROSS-REFERENCE TO RELATED APPLICATIONS

The present application is a continuation of U.S. patent application Ser. No. 14/134,440, filed Dec. 19, 2013, which claims priority benefit to U.S. Prov. App. No. 61/740,370, filed Dec. 20, 2012, and is a continuation-in-part of U.S. application Ser. No. 13/787,609, filed Mar. 6, 2013, now U.S. Pat. No. 9,298,715, issued Mar. 29, 2016, which claims priority benefit to U.S. Prov. App. No. 61/607,728, filed Mar. 7, 2012, each of which is hereby incorporated herein by reference in its entirety.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

SUMMARY

Security criteria for interacting with storage arrays can vary across vendors and product lines. For instance, some vendors may specify that a certain limited number of media agents or other components can be authorized to directly interact with the array in order to limit unauthorized access and otherwise preserve data security. However, in many data storage environments a single storage array or group of storage arrays are used to store and manage data generated by a relatively large number of client computing devices or other sources. Moreover, it is desirable for a data storage solution to be compatible with a large number of storage products provided by different vendors.

In order to address these and other challenges, a data storage system according to certain embodiments designates a particular media agent (or other appropriate component) or group thereof to act as a centralized proxy to communicate directly with a storage device for performing certain storage operations (e.g., hardware snapshot operations) of client data sets. In this manner, the systems and methods described herein can provide efficient, straightforward integration of a variety of storage products provided by different vendors. For instance, the techniques described herein are compatible with the following storage products, without limitation: EMC Clariion, EMC Symmetrix, EMC Celerra, Dell EqualLogic, IBM XIV, NetApp FAS, and HP EVA, and HP 3PAR disk arrays.

In some embodiments, a method for performing a storage operation using a proxy secondary storage computing device is provided. In certain embodiments, the method includes receiving at a first computing device a request to perform a storage operation from a second computing device. In some embodiments, the first computing device and the second secondary storage computing device form part of a networked storage system comprising at least one storage device that is capable of performing the storage operation. The method can further include forwarding, using the first computing device, the storage operation request to the storage device on behalf of the second computing device. In certain embodiments, the storage device performs the storage operation in response to receipt of the storage operation request. The method can further include receiving, at the first computing device, an identifier associated with the performed storage operation, and forwarding the identifier to the second computing device.

In some embodiments, the second secondary storage computing device forwards the identifier to a client computing device. In certain embodiments, the second secondary storage computing device communicates directly with the storage device for a first set of storage operations and communicates with the storage device via the first secondary storage device for a second set of storage operations. In some embodiments, the first set of storage operations comprises reading data from the storage device and the second set of storage operations comprises performing a snapshot of data residing on a client computing device.

In certain embodiments, the second secondary storage computing device is not in direct communication with the storage device and is only in indirect communication with the storage device via the first secondary storage computing device. In some embodiments, the second secondary storage computing device does not have direct access to the storage device and only indirectly accesses the storage device via the first secondary storage computing device. In certain embodiments, the method further includes receiving storage operation requests from a plurality of other secondary storage computing devices, and forwarding the storage operation requests to the storage device.

In some embodiments, the storage operation request comprises a request to perform a snapshot of data residing in a client computing device associated with the second secondary storage computing device. In certain embodiments, the first secondary storage computing device authenticates with the storage device prior to forwarding the storage operations request to the storage device.

In certain embodiments, a data storage system is described that includes a storage device configured to perform snapshot operations on data residing on the storage device, and a first computing device in communication with a second computing device, a third computing device, and the storage device. In some embodiments, the first computing device can be configured to receive a storage operation request device from the second secondary storage computing device, and forward, using the first secondary storage computing device, the storage operation request to the storage device on behalf of the second secondary storage computing device. In certain embodiments, the storage device performs the storage operation, receives an identifier associated with the performed storage operation, and forwards the identifier to the second secondary storage computing device.

In some embodiments, the second secondary storage computing device forwards the identifier to a client computing device. In certain embodiments, the second secondary storage computing device is configured to communicate directly with the storage device for a first set of storage operations and communicate with the storage device via the first secondary storage device for a second set of storage operations. In some embodiments, the first set of storage operations comprises reading data from the storage device and the second set of storage operations comprises performing a snapshot of data residing on a client computing device.

In certain embodiments, the second secondary storage computing device is not in direct communication with the storage device and is only in indirect communication with the storage device via the first secondary storage computing device. In some embodiments, wherein the second secondary storage computing device does not have direct access to the storage device and only indirectly accesses the storage device via the first secondary storage computing device. In certain embodiments, the first secondary storage computing device is further configured to receive storage operation requests from a plurality of other secondary storage computing devices and forward the storage operation requests to the storage device.

In some embodiments, the storage operation request comprises a request to perform a snapshot of data residing in a client computing device associated with the second secondary storage computing device. In certain embodiments, the first secondary storage computing device authenticates with the storage device prior to forwarding the storage operations request. In some embodiments, the requested storage operation comprises a snapshot operation. In certain embodiments, the requested storage operation comprises an archive operation.

DETAILED DESCRIPTION

Figure 1A:
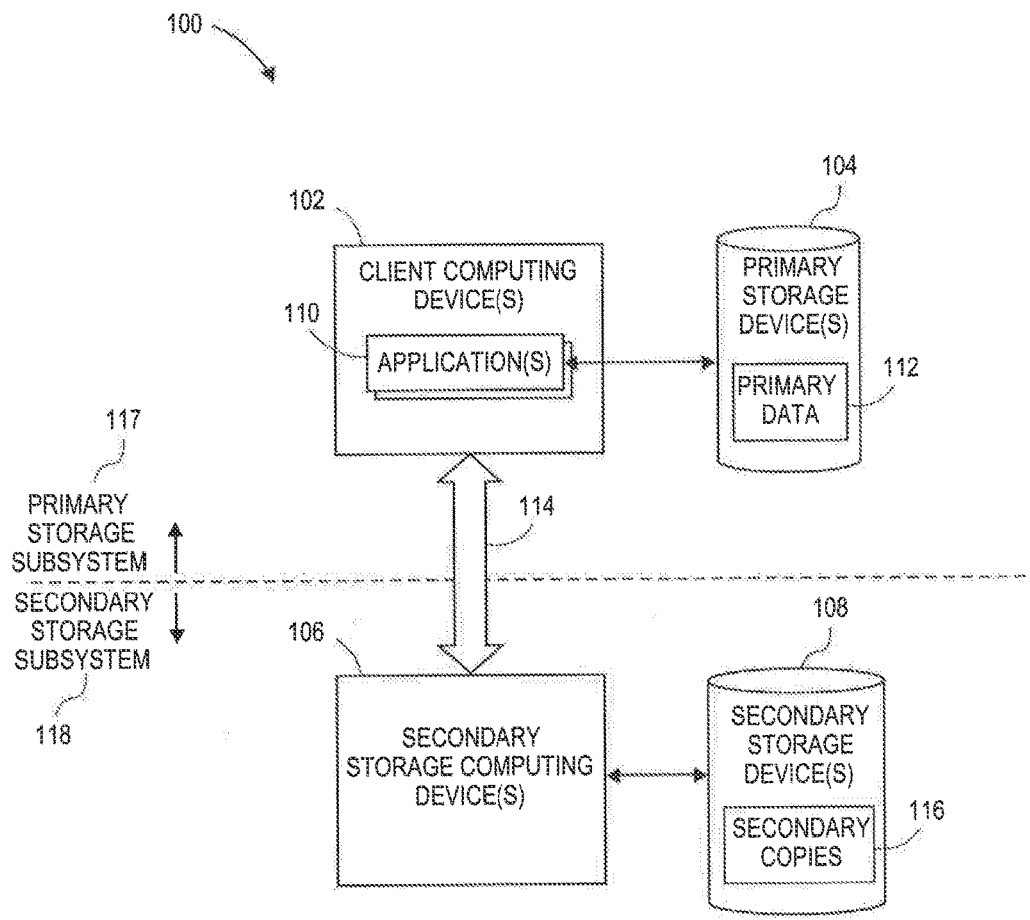
FIG. 1A is a block diagram illustrating an exemplary information management system.

Generally described, the present disclosure is directed to a system, method, and computer readable non-transitory storage medium for a storage management system. Specifically, embodiments described herein include systems and methods to perform storage operations on client data using a proxy device, such as one or more media agents or other components.

As indicated above, a data storage system according to certain embodiments designates a particular media agent (or other appropriate component) or group thereof to act as a centralized proxy to communicate directly with a storage device for performing certain storage operations (e.g., hardware snapshot operations) of client data sets. For instance, in some cases requests to perform storage operations are routed through a proxy media agent, which interfaces with storage media. The storage media in some embodiments comprises a storage array capable of creating and maintaining snapshots (e.g., hardware snapshots) of primary copy data (e.g., production or "live" copies of client data). In some cases, the proxy media agent can directly communicate with the storage media to implement control functionality, such as by authorizing and authenticating access to the storage media, communicating the request to the storage media, receiving completion and other information regarding the operation, and the like.

As an example, and not to be construed as limiting, the storage manager can contain a storage policy that determines how frequently a snapshot is taken of a particular set of client data. Based on the storage policy, the storage manager instructs the client to initiate the snapshot operation. The storage manager may further instruct a first media agent residing on or otherwise associated with the client to coordinate the snapshot operation. Rather than interacting directly with the storage device, the first media agent communicates with a proxy media agent, which in turn interacts with the storage media to initiate the storage operation. For instance, the proxy media agent can authenticate with and transmit the storage operation request to the storage device.

The storage device performs the requested snapshot operation and notifies the proxy media agent upon completion. The notification can include, but is not limited to a snapshot identifier, a disk array identifier, creation time, or other information related to the snapshot. Upon receiving the notification from the storage device, the proxy media agent transmits relevant data to the first media agent and the requesting client. The client can then notify the storage manager that the storage operation has been completed. The storage operations can include, but are not limited to a snapshot creation, mount, revert, destroy, unmount, unmap, etc.

Further examples of systems and methods for performing storage operations using a centralized proxy component are shown and described below with respect to FIGS. 7-9, for example.

In addition, embodiments described herein include systems and methods for servicing requests to perform storage on client data, where multiple clients share underlying storage media. The requests, as well as the results of the storage operations, are routed through a proxy, which interfaces with the storage media. The proxy may be a physical host in a virtualized computing environment or may be implemented on a host in a virtualized computing environment. And the clients may be physical clients, or virtual clients instantiated on the host. In other cases, the proxy and the clients are implemented on separate computing devices. Furthermore, the clients may not have direct access to the hardware array or other storage device. In some embodiments, for example, the clients cannot perform one or more types of storage operations (e.g., snapshot operations) without the aid of the proxy. In some embodiments, the clients only communicate with and/or access the storage device via the proxy.

As an example, and not to be construed as limiting, the storage manager can contain a storage policy that determines how frequently a snapshot is taken of the client and the proxy client, how and when data is to be reverted, etc. Based on the storage policy, the storage manager transmits a storage operation request to the client. The client, recognizing that it is unable to perform the storage operation request, requests that the proxy client perform the storage operation request. The proxy client receives the storage operation request and identifies the portions of hardware storage that contain the data associated with the client. The proxy client then transmits the storage operation request to the storage device, specifying the portions of hardware storage that contain the data associated with the client.

The storage device performs the requested storage operation on the specified portions of hardware storage and notifies the proxy client upon completion. The notification can include, but is not limited to a snapshot identifier, a disk array identifier, or other information related to the snapshot. Upon receiving the notification from the storage device, the proxy client transmits relevant data to the client. The client can then notify the storage manager that the storage operation has been completed.

In some embodiments, the storage operation is a snapshot creation. Accordingly, the storage manager transmits a snapshot command based on a storage policy to the client. Upon receiving the command and determining that the client is unable to create the snapshot, the client transmits a snapshot creation request to the proxy client. The client identifies the portions of physical storage in the disk array that contain the data associated with the client. The proxy client transmits the snapshot creation request to the storage device, identifying the portions of physical storage in the disk array that are to form part of the snapshot. Upon creating the snapshot, the storage device transmits to the client a snapshot identifier, and other information. For example, the storage device can transmit a volume snap identifier, a group identifier, the status of the device, creation time, and/or an array identifier. The proxy client transmits a snapshot identifier to the client, and the client notifies the storage manager that the snapshot has been created.

In certain embodiments the storage operation can be a mount or read of a snapshot. In such an embodiment the storage manager transmits a mount/read command of a particular snapshot to the client. Upon receiving the command, the client determines whether the client is able to mount the particular snapshot. If the client does not have access to the storage device or is otherwise unable to mount the particular snapshot directly, the client requests the proxy client to map the portions of the storage device that contain the snapshot data to the client. In the request, the client can include the snapshot identifier. The proxy client communicates with the storage device to identify the portions of physical storage in the disk array that contain the data associated with the client, including the particular snapshot. The proxy client requests location identifying information of the portions of physical storage from the disk array that contain the particular snapshot, and the storage device retrieves the location identifying information, or snapshot disk data. The proxy client in turn transmits the snapshot disk data to the client. Upon receiving the snapshot location information and/or disk data, the client can mount the snapshot and notify the storage manager of the completion of the mounting. Once mounted, the client can access the snap mounted disk directly.

In some embodiments, the storage operation is a snapshot revert operation, where the snapshot is accessed to revert the virtual client data store back to the state it was in at the time the snapshot was taken. In such an embodiment, the storage manager transmits a revert command to the client to revert to a specified snapshot. The client determines that it cannot perform the revert operation alone and transmits the reversion request to the proxy client, such as the agent of the proxy client. The reversion request can include information uniquely identifying the specified snapshot, such as location information, other disk data and/or a snapshot identifier, etc. The proxy client transmits the request for the reversion to the storage device. The storage device uses the information received from the proxy client to revert to an earlier snapshot version of the data related to the requesting client. Once the storage device has completed the reversion, the storage device notifies the proxy client and the proxy client notifies the client. In turn, the client notifies the storage manager of the completion of the reversion.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. Pub. No. 2012/0084269, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as or information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
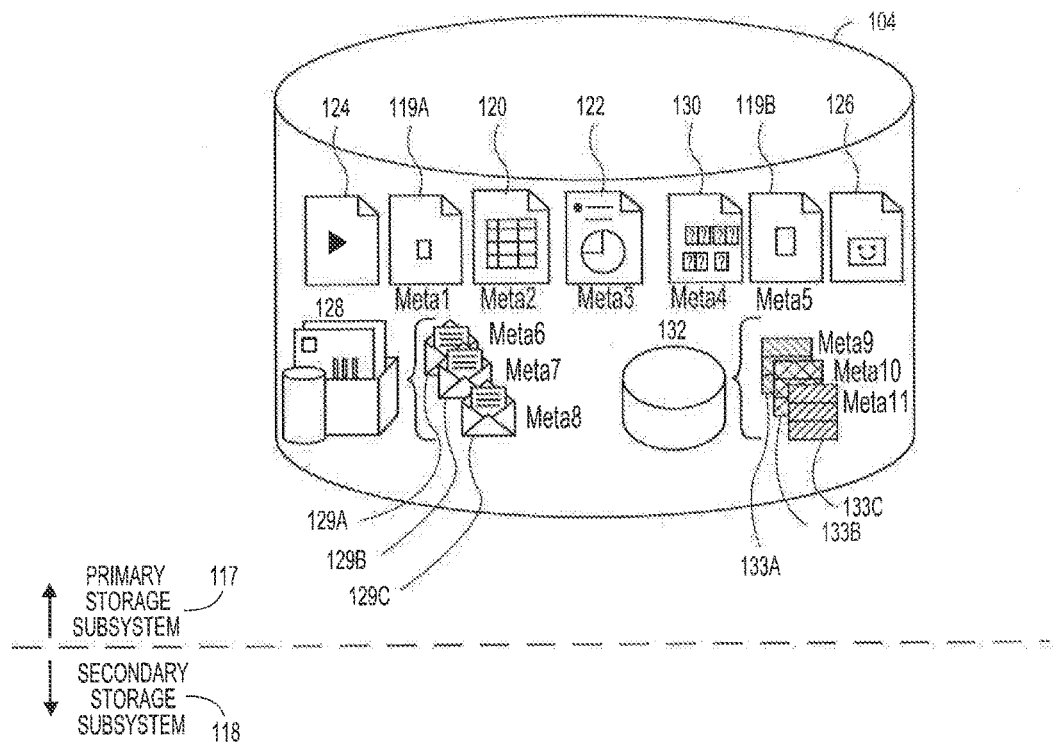
FIG. 1B is a detailed view of a primary storage device, a secondary storage device, and some examples of primary data and secondary copy data.
Figure 1B:
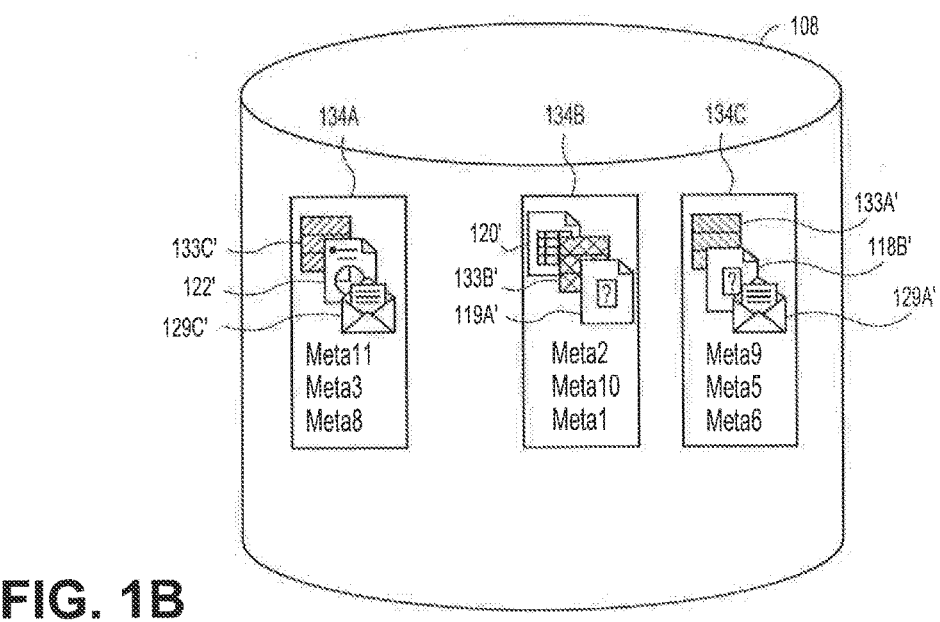

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Metal-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
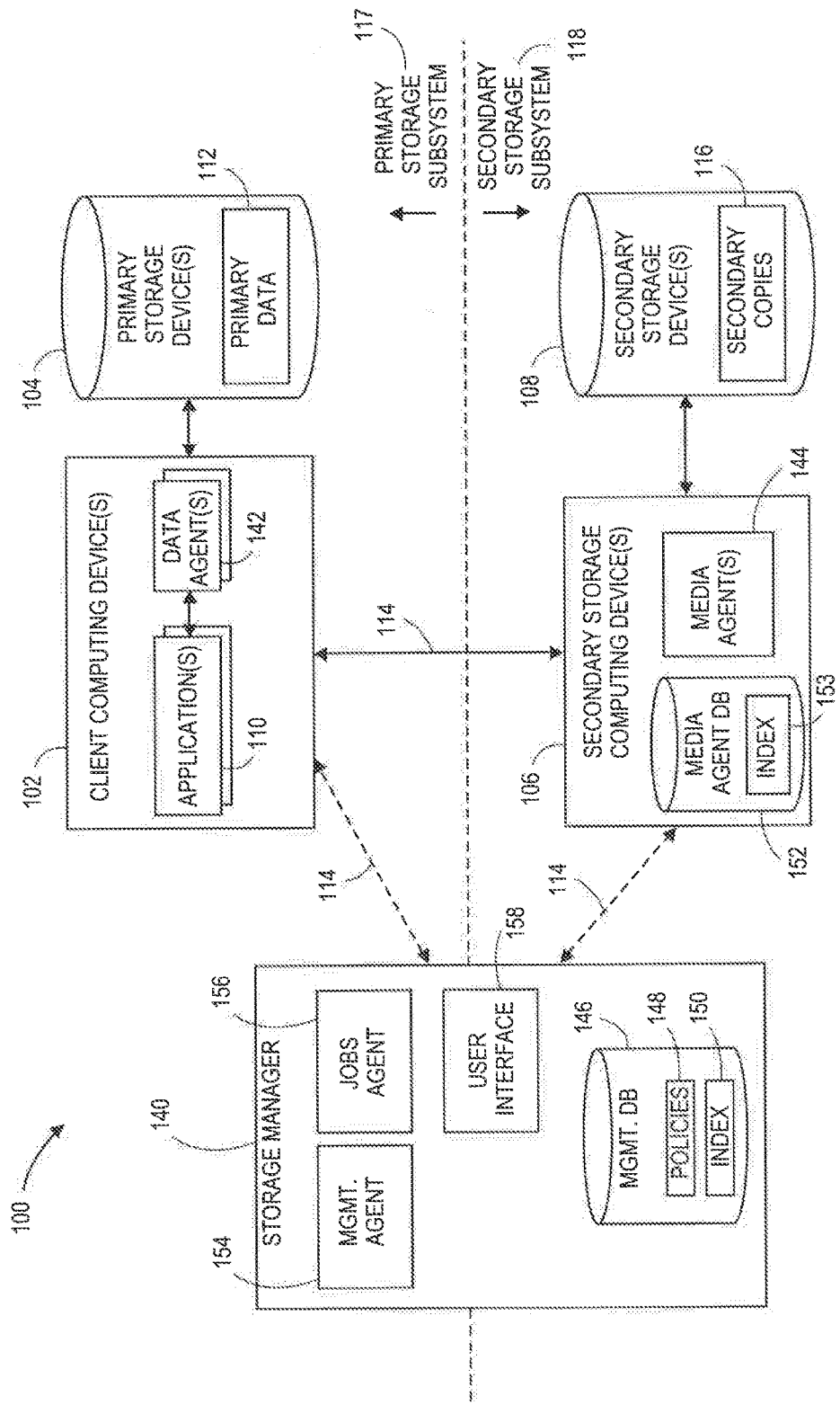
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
- initiating execution of secondary copy operations;
- managing secondary storage devices 108 and inventory/capacity of the same;
- allocating secondary storage devices 108 for secondary storage operations;
- monitoring completion of and providing status reporting related to secondary storage operations;
- tracking age information relating to secondary copies 116, secondary storage devices 108, and comparing the age information against retention guidelines;
- tracking movement of data within the information management system 100;
- tracking logical associations between components in the information management system 100;
- protecting metadata associated with the information management system 100; and
- implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 by even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As will be described in greater detail below with reference to FIG. 2, in some embodiments, a subset of the media agents 114 can be designated as proxy media agents. In such embodiments, the proxy media agents can communicate directly with the secondary storage devices 108 on behalf of the other media agents 114. In this manner, the security of the secondary storage devices 108 can be improved as fewer devices have access to them. In addition, the use of proxy media agents can provide generic compatibility with certain types of disk arrays, such as EMC Clarion, EMC Symmetrix, EMC Celerra, Dell EqualLogic, IBM XIV, NetApp FAS, and HP EVA, and HP 3PAR disk arrays.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
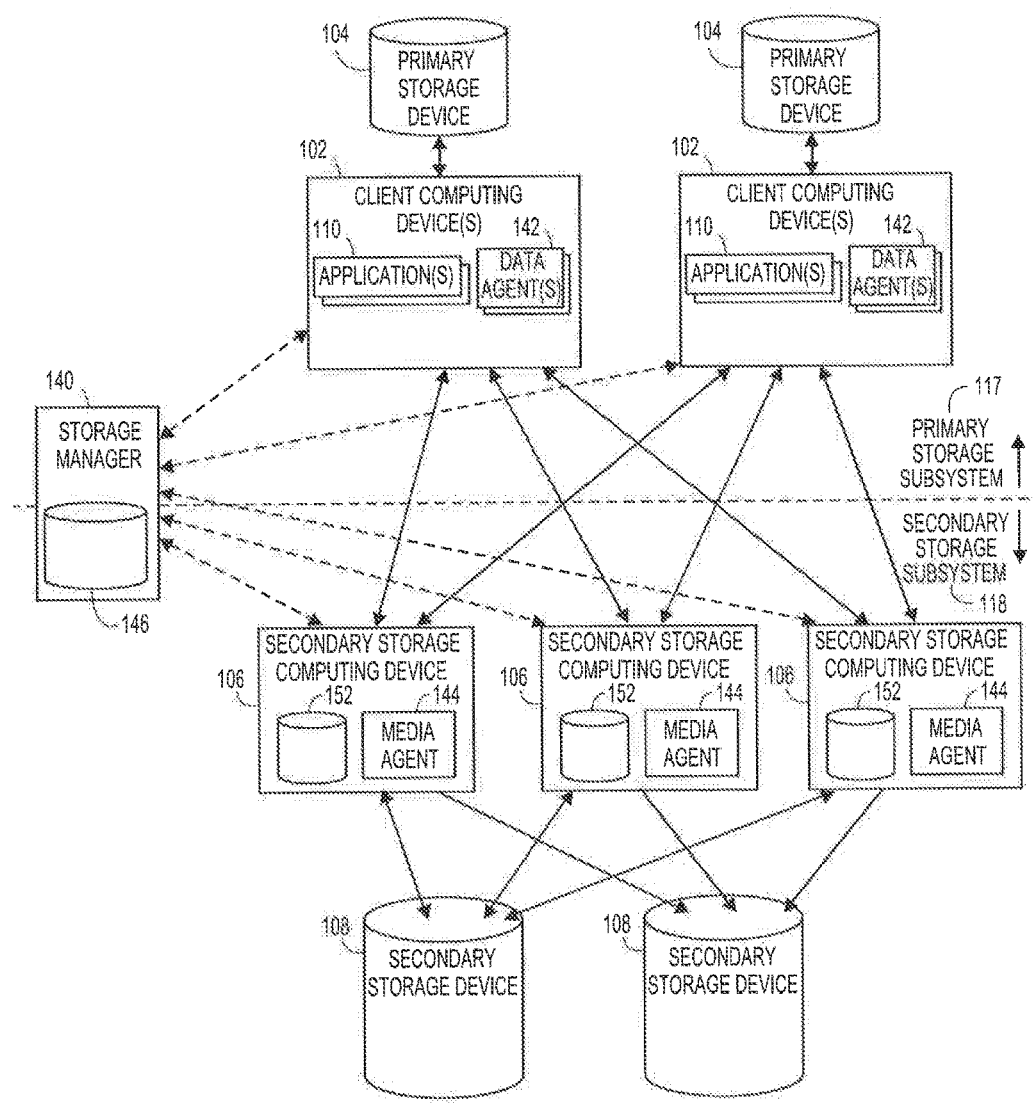
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups. Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084269, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

schedules or other timing information, e.g., specifying when and/or how often to perform information management operations;

the type of secondary copy 116 and/or secondary copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation between different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality) of a data object, e.g., as determined by its content and/or metadata;

the current or historical storage capacity of various storage devices;

the current or historical network capacity of network pathways connecting various components within the storage operation cell;

access control lists or other security information; and
the content of a particular data object (e.g., its textual content) or of metadata associated with the data object.

Exemplary Storage Policy and Secondary Storage Operations

Figure 1E:
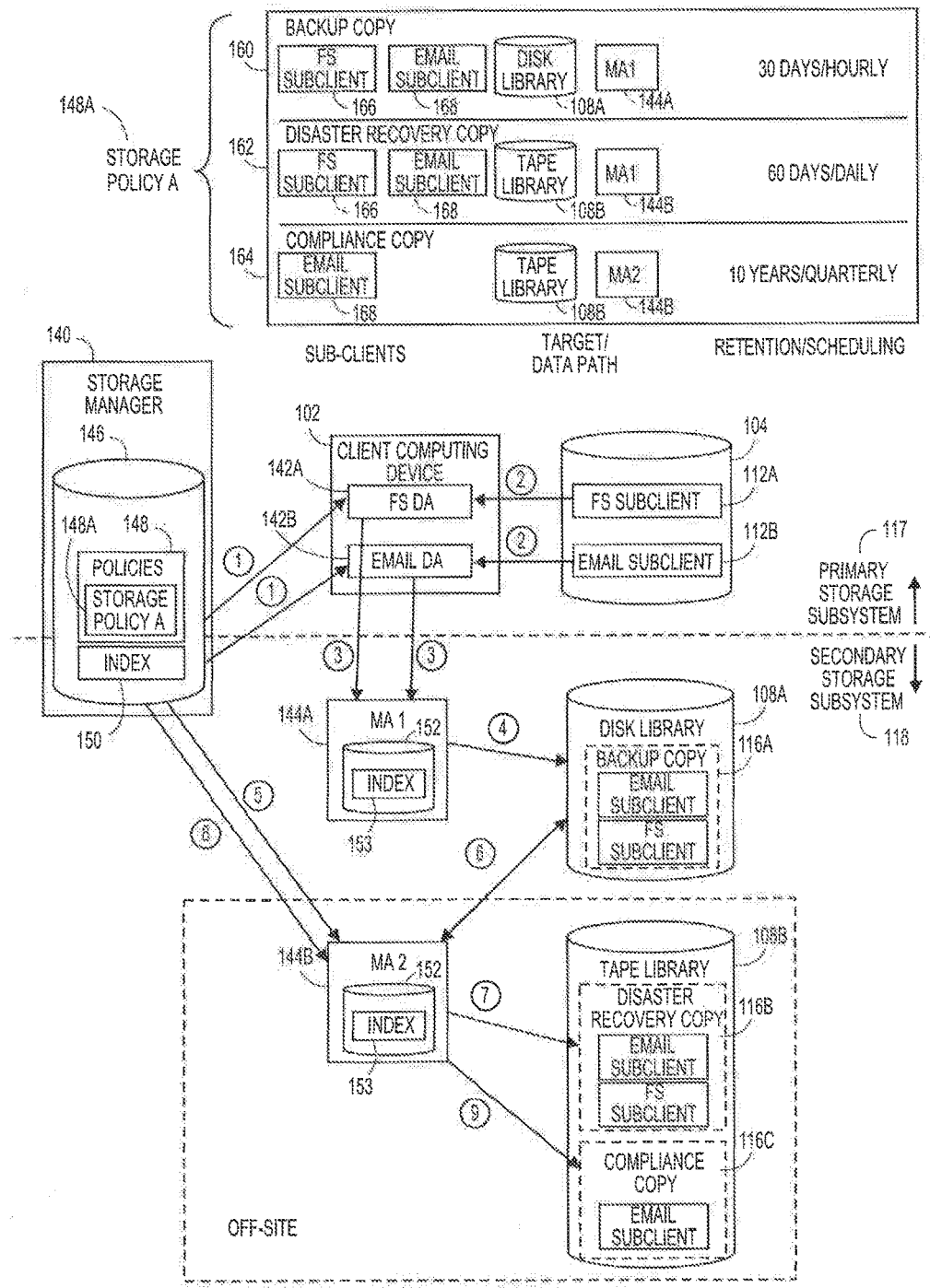
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

Example Virtualized Systems Including Proxies for Performing Storage Operations

Figure 2A:
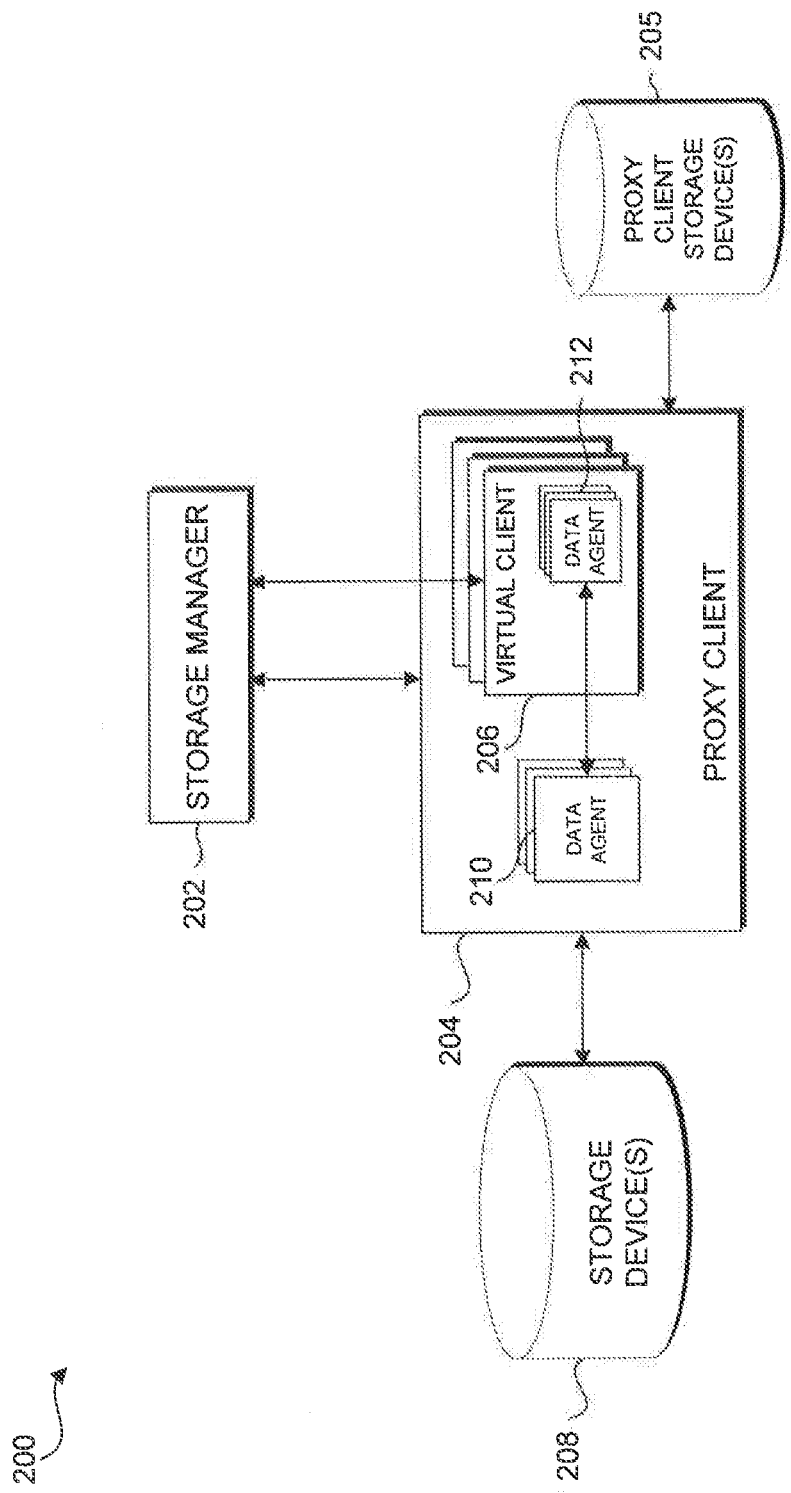
FIGS. 2A-2C are block diagrams illustrative of embodiments of a storage network environment including a proxy client communicating with a storage device on behalf of a client.
Figure 2B:
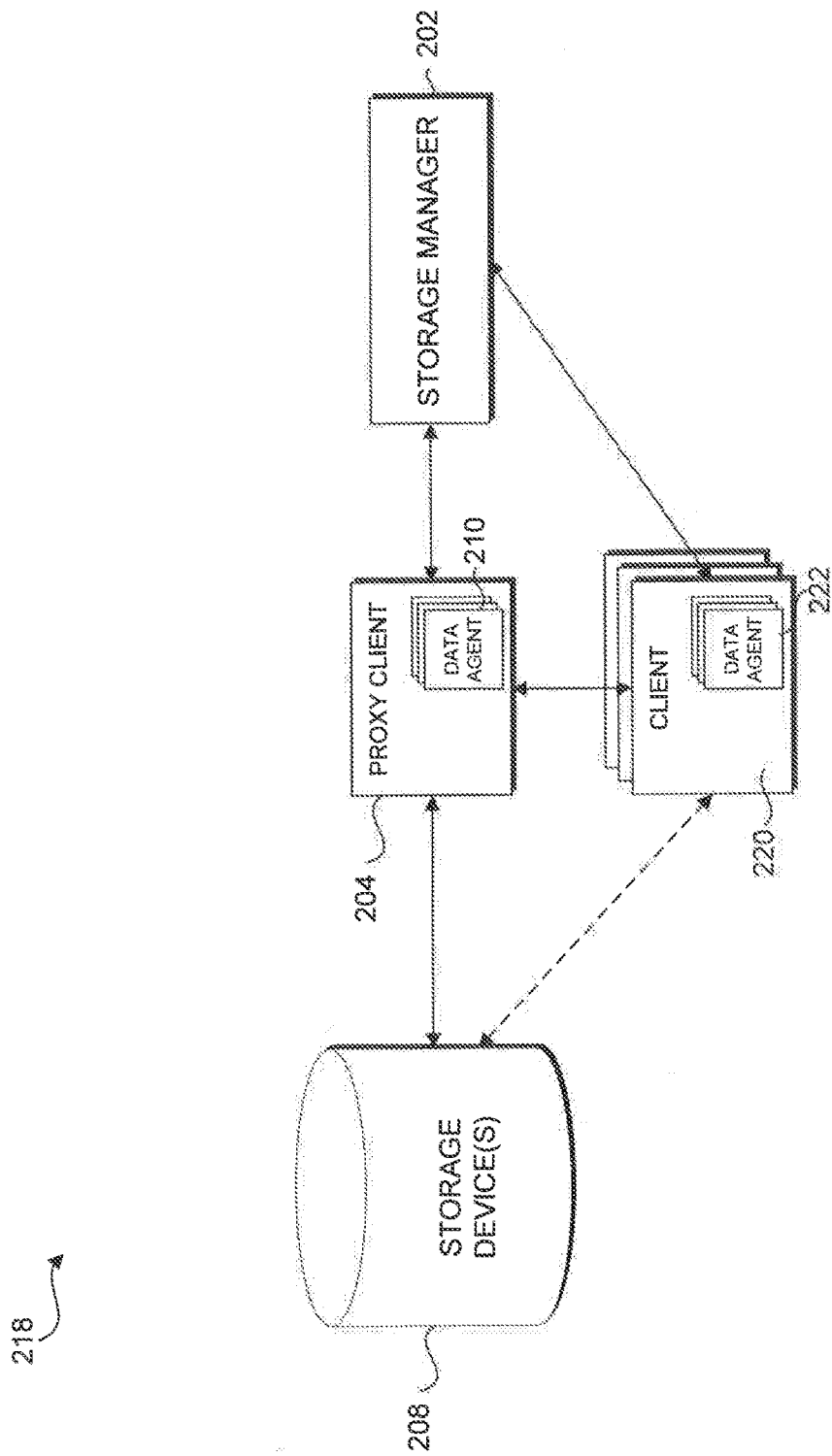
Figure 2C:
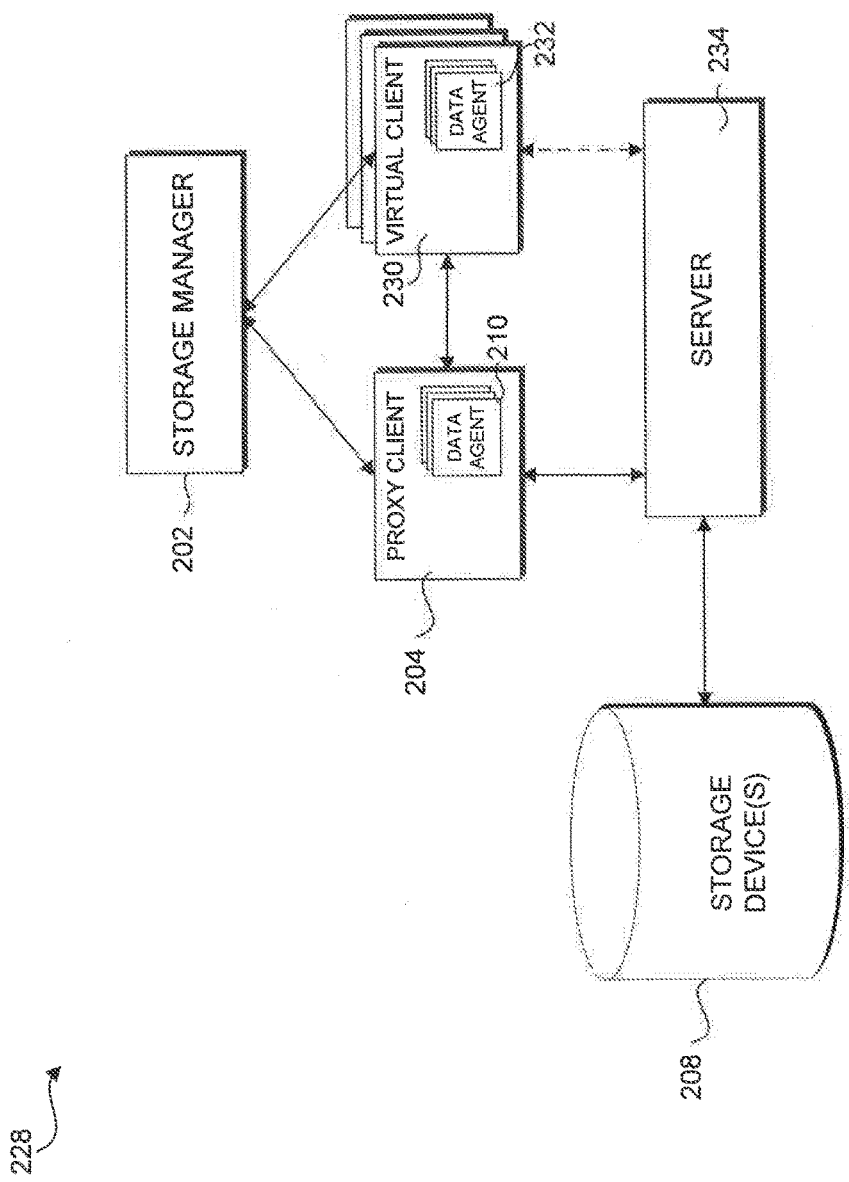

FIGS. 2A-2C are block diagrams illustrative of embodiments of respective storage systems 200, 218, 228, each including a proxy computing device 204 (also referred to as proxy client 204) communicating with at least one storage device 208 on behalf of at least one client computing device 206, 220, 230.

FIG. 2A is a block diagram illustrative of an embodiment of a storage system 200. The system 200 includes a storage manager 202, a proxy client computing device 204, at least one virtual client computing device 206 (also referred to as virtual client 206), and a storage device 208. The proxy client 204 communicates with the storage device 208 on behalf of virtual client(s) 206. The components of the storage system 200 communicate with each other via any appropriate type of network, including wired or wireless networks including, but not limited to a SAN, LAN, WAN, the internet, etc. In some embodiments, the system can further include a proxy client storage device 205. In certain embodiments, the proxy client storage device 205 is local to the proxy client 204, while the storage device 208 is remotely located. Furthermore, the proxy client storage device 205 can store data that is not stored in the storage device 208 and that is accessible by the proxy client 204 and/or virtual clients 206. For example, the proxy client storage device 205 can store executable files, system files, application files, and other files that are selected to not be stored in the storage device 208. Accordingly, during backup operations in certain embodiments, the data stored in the proxy client storage device 205 is not backed up to the storage device 208. In some embodiments, a subset of the files stored in the proxy client storage device 205 are backed up or otherwise copied to the storage device 208.

The storage manager 202 can generally be configured to coordinate storage operations, and invokes the other modules to implement storage operations, e.g., according to a storage policy. The storage manager 202 can be similar to or the same as the storage manager 140 of FIGS. 1A-1E. Similarly, the proxy client 204 and virtual client(s) 206 may be similar to or the same as the client computing device 102 described previously with respect to FIGS. 1A-1E. For example, the proxy client 204 and virtual clients 206 can include one or more data agents 210, 212, respectively. In the illustrative embodiment of FIG. 2A, the proxy client 204 is a host computing device, and includes one or more of the virtual clients 206 instantiated thereon. For instance, the proxy client 204 may have a virtual machine manager (VMM) (not shown) instantiated thereon, which may also be referred to as a hypervisor. The VMM can implement a hardware virtualization allowing the virtual clients 206 to run concurrently on the host computer. The proxy client 204 may also be referred to herein interchangeably as one or more of a proxy device, proxy computing device, host, or host computing device.

The VMM, in certain embodiments, generally operates as a supervisory program, presenting the virtual clients 206 a virtual operating platform and managing execution of the virtual clients 206. For instance, the virtual clients 206 may comprise guest operating systems running concurrently on the proxy client 204. The operating systems associated with the virtual clients 206 can be the same type of operating system as the operating system that is running on the proxy client 204. Or, in other configurations, the operating system associated with one or more of the proxy clients 206 may be of a different type than the operating system running on the proxy client 204. Moreover, while each of the virtual clients 206 may have the same type of associated operating system in some cases, in other embodiments, one or more of the virtual clients 206 has a different associated operating system than one or more of the other virtual clients 206. The specific types of operating systems executing on the proxy client 204 and the virtual clients 206 can vary. For instance, depending on the configuration, one or more of the following, or other operating systems can be used: Microsoft Windows, Unix, Linux, Mac OS X, Android, iOS and z/OS.

In some embodiments, such as where the proxy client 204 and the virtual clients 206 run the same type of operating system, the virtual clients 206 comprise operating system-level virtualizations. In such cases, each of the virtual clients 206 forms an isolated user-space instance. For instance, each of the virtual clients 206 can act as an isolated virtual server (e.g., a zone, such as a Solaris Zone) within the single operating system that is running on the proxy client 204. In one such embodiment, the virtual clients each implement containers (e.g., Solaris Containers), where each container forms a combination of system resource controls and boundary separation, provided by zones, for example.

Each of the virtual clients 206 can further include one or more data agents 212. In some embodiments the virtual clients 206 do not have direct access to the storage device 208. Thus, as will described in greater detail, the virtual clients 206 communicate with the storage device 208 indirectly via the proxy client 204.

The storage device 208 can include one or more storage devices of any appropriate type (e.g., hard-drive, tape, solid state, etc.) and can be a local storage device of the proxy client 204 or remote from the proxy client 204, depending on the embodiment.

In some embodiments, the storage device 208 is capable of performing snapshot operations. And in some cases, the storage device 208 performs the snapshot operations substantially independently, using hardware, firmware and/or software residing on the storage device 208. For instance, the storage device 208 may be capable of performing snapshot operations upon request, without intervention or oversight from any of the other components in the system 200. Where the storage device 208 performs the snapshot operation in this self-contained fashion, without the involvement of the proxy client 204 or other components in the system 200, the snapshot may be referred to as a "hardware snapshot". In some embodiments, the system 200 is capable of performing "software snapshots" in which the proxy client 204 or other components in the system manage the snapshot operation. The storage device 208 is also capable of performing additional operations, such as, but not limited to, logical unit number (LUN) provisioning, snapshot queries, mapping LUNs to a host, and running storage reports for clients.

The proxy client 204 can be in communication with the storage device 208 over a network (e.g., a LAN or WAN). Furthermore, the storage device 208 can include sufficient storage capacity to serve the needs of not only the proxy client 204, but also the hosted virtual clients 206. The memory space of the storage 208 can be allocated amongst the various clients such that separate portions are dedicated to each virtual client 206 and to the proxy client 204. Furthermore, the storage device 208 can store primary and/or secondary copies of data associated with the proxy client 204 and virtual client 206. In some embodiments, the storage device 208 is similar to the primary storage device 104 of FIGS. 1A-1E. In certain embodiments the storage device is similar to the secondary storage device 108 of FIG. 1. In yet further embodiments, the storage device 208 is similar to primary storage device 104 and/or secondary storage device 108 of FIGS. 1A-1E.

Because the virtual clients 206 do not have direct access to the storage device 208, the proxy client 204 is used to interface with the storage device 208 to perform certain storage operations on behalf of the virtual clients 206. The storage operations can include, but are not limited to, the creation of a snapshot, the mounting and un-mounting of a snapshot, and reversion to a particular snapshot. For example, if a storage policy dictates that a snapshot is to be taken of data associated with the one of the virtual clients 206 (e.g., of the entire file system, or of select directories, folders or files associated with the virtual client 206), the storage manager 202 instructs the appropriate data agent(s) 212 on the virtual client 206 to perform the snapshot operation. In one embodiment, the storage manager 140 instructs the Microsoft Exchange data agent 212 to perform a snapshot of certain Microsoft Exchange production data of the virtual client 206. The data agent 212 forwards the snapshot request to an appropriate data agent 210 or other component of the proxy client 204. In turn, the proxy client 204 forwards the request to create the snapshot to the storage device 208 on behalf of the virtual client 206.

In response to the request, the storage device 208 creates a snapshot of the desired virtual client data. The snapshot may reside in a portion of the storage device 208 dedicated to storing data for the particular virtual client 206, for example. Or the storage device 208 may instead allocate space for snapshot requests in some other manner, e.g., based on an allocation policy maintained by the storage device 208.

Similarly, when the virtual client 206 desires to mount a previously unmounted or unknown snapshot, the virtual client 206 can request the mounting of the data from the data agent 210 of the proxy client 204. In turn, the proxy client 204 requests the mounting data, or disk array data from the storage device 208. Upon retrieving the disk array information of the snapshot, the storage device 208 transmits the data to the proxy client 204. The proxy client transmits the data to the virtual client 206 and the virtual client is then able to mount and/or access the snapshot as desired.

FIG. 2B is a block diagram illustrative of an embodiment of a storage network environment 218 including a proxy client communicating with a storage device 208 on behalf of a client computing device 220 (also referred to as client 220). The storage manager 202, proxy client 204 and storage device 208 can be similar to or the same as the corresponding components described previously with respect to FIG. 2A. However, the client 220 of FIG. 2B is different from the virtual client 206 of FIG. 2A. For example, the client 220 can be a distinct, non-virtual, physical device, separate from the proxy client 204, such as a personal computer, workstation, server, etc. Although not illustrated in FIG. 2B, the clients 220 can include their own storage devices similar to the proxy client storage device 205, described in greater detail above with reference to FIG. 2A. In addition, the client 220 can in some cases have direct access to the storage device 208 for performing certain functions. However, in some embodiments, the client 220 uses the proxy client 204 to perform one or more other functions, including storage operations (e.g., snapshots), for example. In some embodiments, the client 220 does not have direct access to the storage device 208, and only communicates with the storage device 208 via the proxy client 204. For example, in some instances it is desirable to give only a single client direct access to the storage device 208, e.g., for performing certain storage operations (e.g., snapshots), such as where a security policy dictates such an arrangement. In this way, the security of the storage device can be maintained, and the likelihood of errors or problems occurring during storage operations can be decreased.

Storage operations can include, but are not limited to, creating a snapshot of the client 220, mounting the snapshot information to the client 220, and/or reverting to a previous snapshot of the client 220. In some embodiments, the storage manager 202 can transmit a snapshot creation command to the client 220. Using the data agent 222, the client can request that the proxy client 204 perform the snapshot creation. The client 220 can make the request from the proxy client 204 via the data agent 210 of the proxy client 204. Upon receiving the snapshot creation request, the proxy client 204 can request that the snapshot be created in the storage device 208, as described in greater detail below with reference to FIGS. 3A and 5. Similarly, the client 220 can request the proxy client 204 to retrieve snapshot location information and/or other disk data, and request a reversion of a previous snapshot.

FIG. 2C is a block diagram illustrative of an embodiment of a storage network environment 228 including a proxy client 204 communicating with a storage device 208 on behalf of a virtual client computing device 230 (also referred to as virtual client 230). The storage manager 202, proxy client 204 and storage device 208 can be similar to or the same as the corresponding components described previously with respect to FIGS. 2A and 2B. Furthermore, although not illustrated in FIG. 2B, the proxy client 204 and virtual clients 230 can include their own storage devices similar to the proxy client storage device 205, described in greater detail above with reference to FIG. 2A. The virtual client 230 can be similar to or the same as the corresponding components can be similar to or the same as the virtual client 206 of FIG. 2A, however, the virtual client 230 is not instantiated in the proxy client 204, as is the virtual client 206 of FIG. 2A.

Furthermore, unlike the configurations of FIGS. 2A and 2B, the embodiment of FIG. 2C additionally includes a server 234 that is in direct communication with the storage device 208 and is also in direct communication with the proxy client 204 and the virtual client 230. However, in some embodiments, the virtual clients 230 are not provided with direct access to the storage device 208. For instance, as indicated by the dashed line, the virtual client 230 may communicate with the storage device 208 indirectly via the server 234. In such a situation, the server 234 generally acts as a proxy for the virtual client 230 in relation to interaction with the storage device 208. Or, the virtual client 230 may instead request that a storage operation be performed in the storage device by communicating the request to the proxy client 204. In some embodiments, the data agent 232 of virtual client 230 communicates with the data agent 210 of the proxy client 204 to communicate the storage operation request. In turn, the proxy client 204 relays the request to the server 234, which forwards the request on to the storage device 208.

The storage device 208 receives the request and performs the desired storage operation. Upon completion of the storage operation, the storage device 208 transmits relevant information indicating that the storage operation has been completed to the server 234, which forwards the information to the proxy client 204 (or directly to the virtual client 230, depending on the embodiment). The proxy client 204 thereafter transmits the relevant data to the virtual client 230. As described in greater detail above, once the virtual client 230 receives confirmation of the completion of the storage operation, the virtual client 230 can notify the storage manager 202 that the storage operation has been completed, and/or perform one or more additional steps using the relevant data received. For example, the virtual client 230 can use snapshot disk data (e.g., location information) to mount a snapshot to the virtual client 230.

Figure 3A:
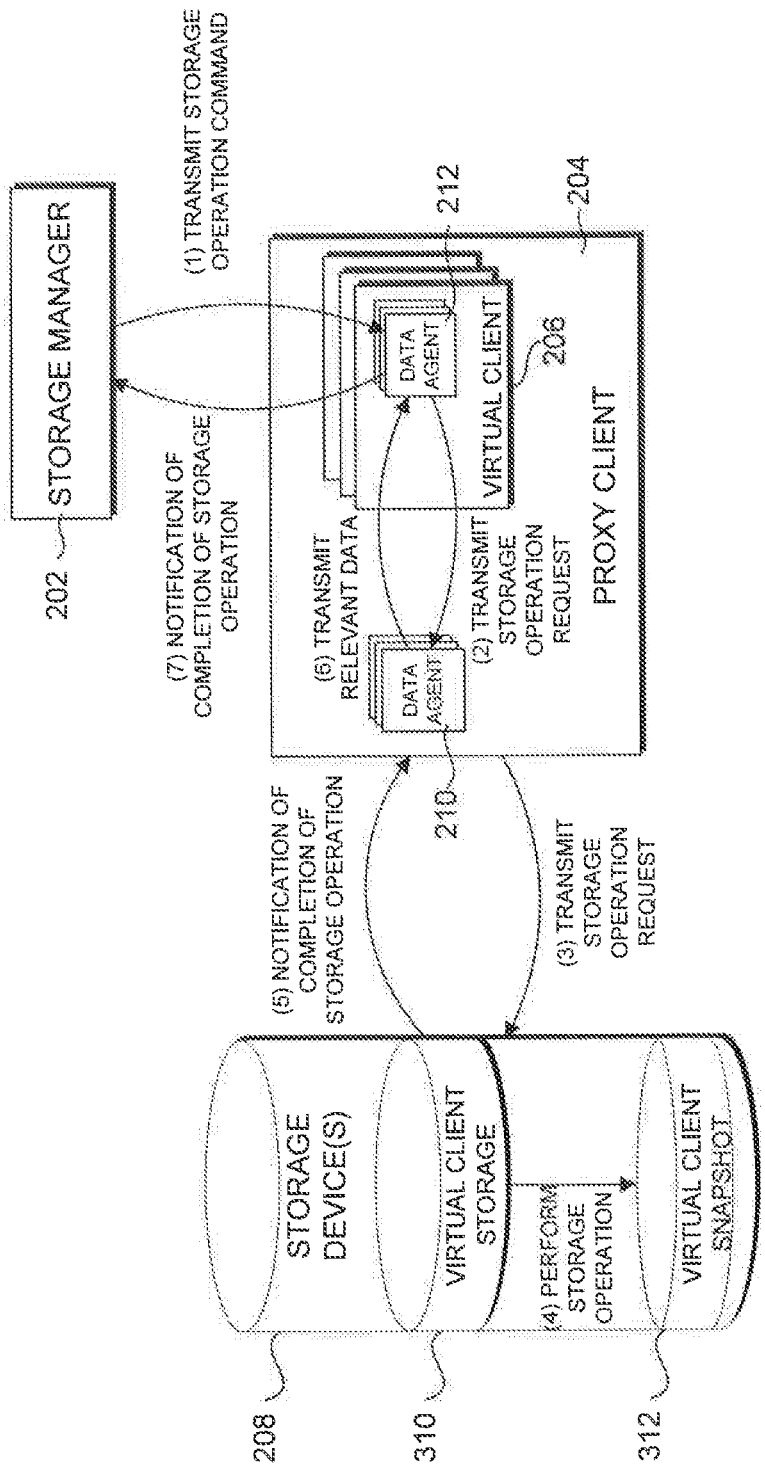
FIGS. 3A and 3B are state diagrams illustrative of the interaction between the various components of the storage network environment of FIG. 2A.
Figure 3B:
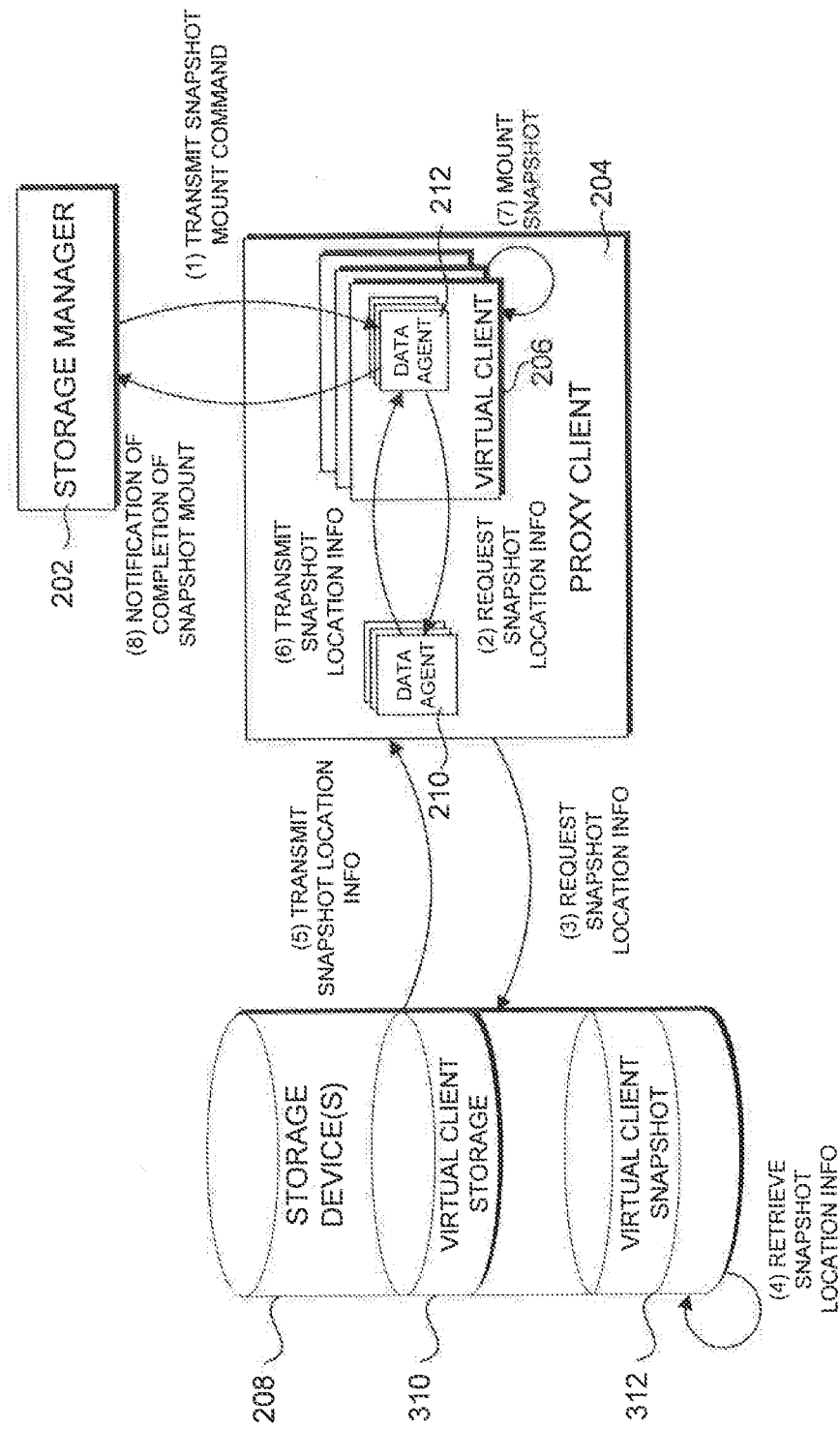

FIGS. 3A and 3B are state diagrams illustrative of example interaction between the various components of the storage network environment 200 of FIG. 2A. For purposes of simplicity, the proxy client storage device 205, described in greater detail above with reference to FIG. 2A, is not shown. Although FIGS. 3A and 3B are directed towards the storage network environment 200 illustrated in FIG. 2A, certain aspects of the state diagrams are compatible with the environments shown in FIGS. 2B and 2C. For instance, similar state diagrams may be illustrative of the interaction between the various components of the storage network environments of FIGS. 2B and 2C. Thus, the state diagrams illustrated in FIGS. 3A and 3B should not be construed as limiting.

FIG. 3A is a state diagram illustrative of the interaction between the various components of the storage network environment 200 to perform a storage operation (e.g., a snapshot). As illustrated, the storage manager 202 (1) transmits a storage operation command to the data agent 212 of the virtual client 206. As mentioned previously, the storage operation command can include any number of different storage operations, such as a snapshot creation, a mounting of a snapshot to the virtual client, a reversion to a previous snapshot, and the like. Upon receiving the storage operation command, the virtual client 206 determines that it is unable to initiate the storage operation by itself directly sending the storage operation request to the storage device 208, and (2) transmits a storage operation request to the data agent 210 of the proxy client 204. Although illustrated as the data agent 212 communicating via the data agent 210, the virtual client 206 can communicate with the proxy client 204 in any appropriate manner.

The storage operation request can include the information to perform the storage operation, and/or for the proxy client 204 to properly initiate the request to the storage device 208 on behalf of the virtual client 206. For example, the storage operation request can include information regarding the particular portion within the storage device 208 that contains the virtual client 206 data, such as one or more address locations or ranges of address locations within the storage device 208. In certain embodiments, the proxy client 204 uses the information from the storage operation request to determine the portion within the storage device 208 that is associated with the data of the virtual client 206. For example, the proxy client 204 can use identifying information relating to the virtual client 206 (e.g., client ID) to determine those portions of the storage 208 that contain data associated with the virtual client 206. The proxy client 204 (3) transmits the storage operation request to the storage device 208.

Upon receiving the storage operation request, the storage device 208 (4) performs the requested storage operation. Upon completion of the storage operation, the storage device 208 (5) notifies the proxy client 204 that the storage operation has been completed. The proxy client 204 (6) transmits relevant data to the data agent 212 of the virtual client 206. In some embodiments, the proxy client 204 transmits the relevant data using the data agent 210. The relevant data can include any and all information to be used by the virtual client 206 to perform one or more operations, and to notify the storage manager 202. In some embodiments, the relevant data can include data requested by the data agent 212 and/or data not requested by the data agent 212. Upon receiving the data from the proxy client 204, the virtual client 206 (7) notifies the storage manager 202 that the storage operation has been completed.

FIG. 3A further illustrates an embodiment of the portion of the storage device 208 associated with the virtual client 206 that includes the virtual client's data and snapshots of the virtual client' data. The portion of the storage device containing the virtual client's data can be an addressable space of the storage device and can include contiguous or non-contiguous addresses. In the illustrated embodiment, the portion of the storage device 208 that is associated with the virtual client 206 is labeled virtual client storage 310. The virtual client storage 310 may store an initial copy of the virtual client's data, backup copies, and/or snapshots. In some embodiments, snapshots of the virtual client's data, or virtual client snapshots 312, can reside in the same or different portion of the storage device 208 as the virtual client storage 310.

Upon receiving a snapshot creation request, the storage device 208 performs a snapshot 312 of the virtual client storage 310 contained within the storage device 208. The storage device 208 creates the virtual client snapshot 312 based on the snapshot request and/or on the data stored in the virtual client storage 310. For instance, the snapshot 312 may comprise a set of pointers to the first portion 310 for un-modified virtual client data, as well as actual data copies for modified virtual client data, according to a copy-on-write scheme, for example. Upon completion of the snapshot creation, the storage device 208 notifies the proxy client 206 that the snapshot has been created.

The proxy client 204 transmits a snapshot identifier to the virtual client 206. The virtual client 206 can use the snapshot identifier to access the snapshot or at least to verify that the snapshot has been created. For example, the virtual client 206 can include the snapshot identifier of a particular snapshot as part of a request (e.g., access requests, reversion requests, etc.) made to the proxy client 204. The snapshot identifier can contain location information regarding the portion of memory within the storage device 208 that contains the particular snapshot and/or the proxy client 204 can include a look-up table to determine the portion of memory within the storage device 208 that includes the particular snapshot. Once the virtual client receives the snapshot identifier, or other relevant data, the virtual client 206 can notify the storage manager 202 that the snapshot has been created.

FIG. 3B is a state diagram illustrative of the interaction between the various components of the storage network environment when the storage manager 202 issues a snapshot mount command. As illustrated in FIG. 3B, the storage manager 202 (1) transmits a snapshot mount command to the virtual client 206. The snapshot mount command can provide sufficient information such that the virtual client 206 can request that a snapshot be mounted to the virtual client 206. For example, the snapshot mount command can include the snapshot identifier of the snapshot to be mounted, etc. In some embodiments, the snapshot mount command can be included as part of a request to access or read a snapshot previously created for the virtual client 206. Upon receiving the snapshot mount command, and determining that the virtual client 206 does not already have access to the snapshot, the virtual client 206 (2) requests the disk data (e.g., location information) of the virtual client snapshot 312 from the proxy client 204. The disk data of the virtual client snapshot 312, or snapshot disk data, can include location information, such as an address, array, partition, block, tape location, cluster, etc., regarding where the virtual client snapshot 312 is located. As mentioned previously, the virtual client 206 and proxy client 204 can communicate via their respective data agents 212, 210.

The proxy client 204 can use the information related to the virtual client, such as a virtual client identifier and/or a snapshot identifier, to identify the virtual client storage 310 and (3) request the location information and/or other disk data of the virtual client snapshot 312. The storage device 208 can use the received information to identify and (4) retrieve the snapshot location information and/or other disk data of the virtual client snapshot 312.

Upon identifying and retrieving the snapshot disk data of the virtual client snapshot 312, the storage device 208 (5) transmits the snapshot location information and/or other disk data to the proxy client 204. The snapshot location information and/or other disk data can then be (6) transmitted from the proxy client 204 to the virtual client 206. Upon receiving the snapshot disk data, the virtual client 206 can perform additional processes involving the location information and/or other disk data. For example, the virtual client 206 can (7) mount the snapshot, thereby allowing the virtual client 206 to have access to the data contained within the virtual client snapshot 312. Upon mounting the snapshot, the virtual client 206 can (8) notify the storage manager 202 that the snapshot mount operation has been completed.

As mentioned previously, although FIGS. 3A and 3B are directed to state diagrams illustrative of the interaction between the various components of the storage network environment illustrated in FIG. 2A, it is to be understood that similar diagrams can be made for FIGS. 2B and 2C. For purposes of brevity, however, such diagrams have been omitted. The additional diagrams can be made with similar features and may contain variations. For example, a state diagram illustrating the interaction between the components of the illustrative embodiment of FIG. 2C can contain additional steps illustrating the interaction between proxy client 204, server 234, and storage device 208. For example, requests from the client 204 can be sent to the server 234 and forwarded to the storage device 208. Similarly data from the storage device 208 can be transmitted to the server 234 and on to the proxy client 204. One of ordinary skill in the art will understand the various embodiments and modifications that can be made to the state diagrams 3A and 3B in order to illustrate the interaction between the components of the illustrative embodiments of FIGS. 2B and 2C.

FIGS. 4-7 are flow diagrams illustrative of embodiments of routines implemented by a proxy client for requesting a storage device to perform one or more storage operations.

Figure 4:
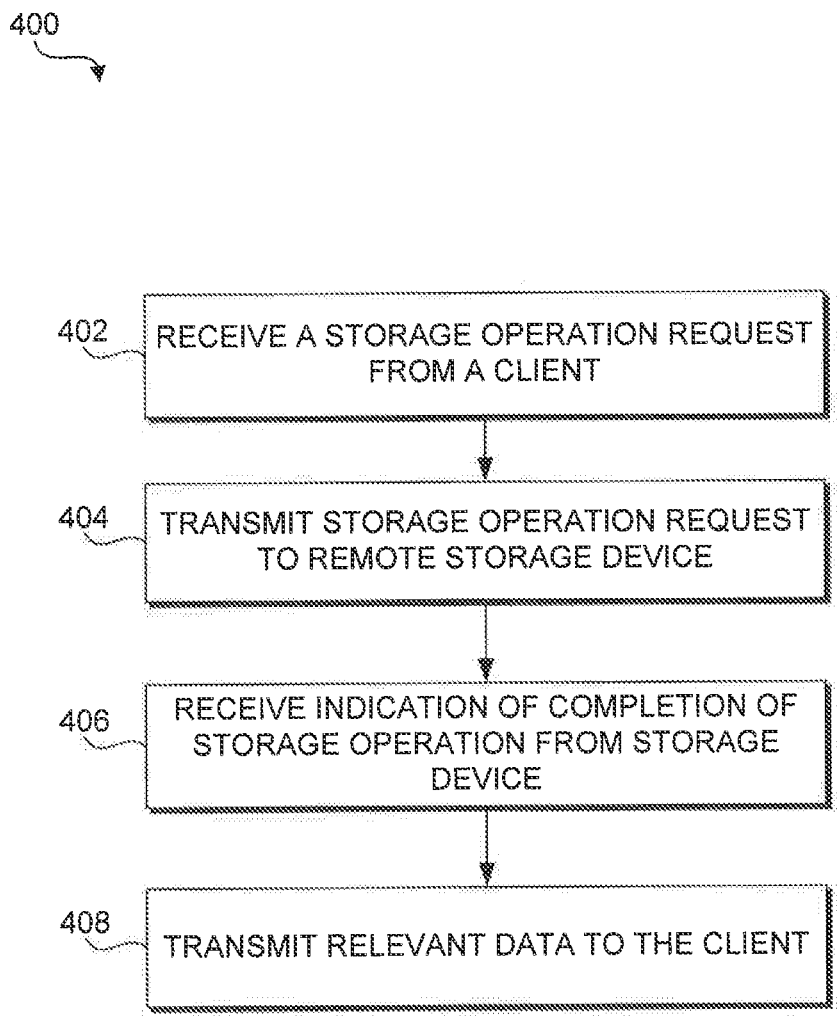
FIGS. 4-7 are flow diagrams illustrative of embodiments of routines implemented by a client proxy for requesting a storage device to perform one or more storage operations on behalf of a client.

FIG. 4 is a flow diagram illustrative of an embodiment of a routine 400 implemented by a client proxy for requesting a storage device to perform one or more storage operations. One skilled in the relevant art will appreciate that the elements outlined for routine 400 can be implemented by one or more computing devices/components that are associated with the proxy client 204. Accordingly, routine 400 has been logically associated as being generally performed by the proxy client 204. However, the following illustrative embodiment should not be construed as limiting.

At block 402, the proxy client receives a storage operation request for a client. The storage operation request can be received from a client such as a virtual client or a separate client device, or can be received from a storage manager on behalf of a client. Furthermore, a storage operation request can include a request to perform, or have performed, one or more storage operations. For example the storage operation request can include, but is not limited to any one or more of a snapshot creation, snapshot mount, and/or a reversion to a previous snapshot. The storage operation request can be received at regular intervals as determined by a storage policy, and can be received from the client, the storage manager, some other computing device and/or a user via wired or wireless communication protocols. In some embodiments, the clients do not have direct access to a storage device storing the data of the clients. In certain embodiments, the clients have limited access to the storage device, but do not have direct access to the storage device for requesting one or more storage operations.

At block 404, the proxy client 204 transmits the storage operation request to a storage device. As mentioned previously, the storage device can include one or more disk arrays storing data related to the clients and the proxy client. In some embodiments, prior to transmitting the storage operation request, the proxy client 204 uses information regarding the client to determine the storage device and location within the storage device where the data associated with the client is stored, and transmits this information to the storage device.

At block 406, the proxy client receives an indication of the completion of the storage operation from the storage device. The indication can include various pieces of information that can be used to verify that the storage operation has been completed. For example, the indication can include a snapshot identifier when a snapshot is created, a snapshot disk identifier when a snapshot is to be mounted to a client, and/or some other identifier when other storage operations are used.

At block 408, the proxy client transmits relevant data to the client. The relevant data can include any one or more identifiers received from the storage device that can be used by the client to verify that the storage operation has completed successfully. Furthermore the relevant data can include additional information that can be used by the client to perform additional processes based on the identifiers received from the proxy client 204.

Additional, fewer, or different blocks can be used to implement the process 400 without departing from the spirit and scope of the description. For example, in some embodiments the client can perform one or more processes using the relevant data received from the proxy client. Furthermore, although not illustrated, the storage manager can transmit a storage operation command to the client, which in turn can transmit a storage operation request to the proxy client.

Figure 5:
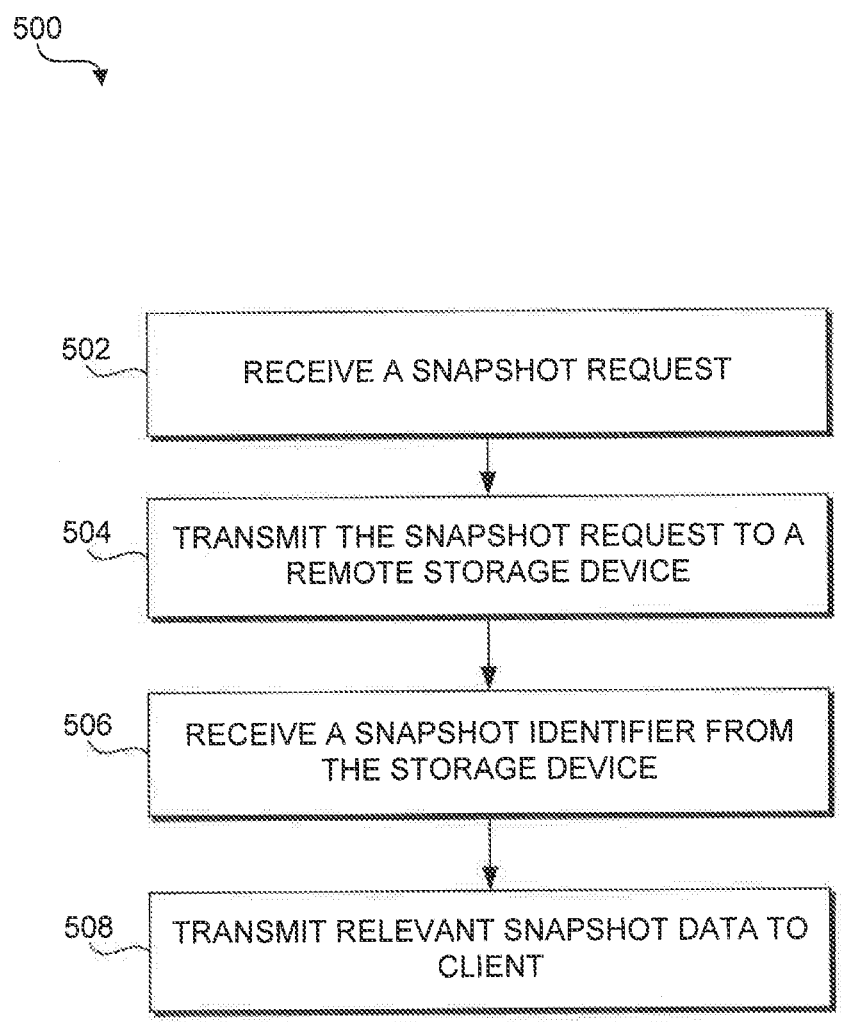

FIG. 5 is a flow diagram illustrative of an embodiment of a routine 500 implemented by the client proxy 204 for requesting a snapshot creation from a storage device. One skilled in the relevant art will appreciate that the elements outlined for routine 500 can be implemented by one or more computing devices/components that are associated with the client proxy 204. Accordingly, routine 500 has been logically associated as being generally performed by the proxy client 204. However, the following illustrative embodiment should not be construed as limiting.

At block 502, the proxy client 204 receives a snapshot request from a client. As mentioned previously, the client can be a virtual client instantiated on the proxy client 204, a virtual client instantiated on a server or other device, or a distinct client separate from the proxy client 204. The snapshot request can be received at regular intervals as determined by a storage policy, and can be received from the client, the storage manager, some other computing device and/or a user via wired or wireless communication protocols.

At block 504, the proxy client 204 transmits a snapshot request to a storage device 208. As mentioned previously, prior to transmitting the snapshot request, the proxy client 204 can identify one or more portions of the storage device 208 that contain the data associated with the client and transmit that data with the snapshot request.

Upon receiving the snapshot request, the storage device 208 performs the snapshot creation by performing a snapshot of the portion of the storage device 208 that includes the data from the client. The storage device 208 can generate a snapshot identifier for the created snapshot. The snapshot identifier can be a number, can be any alphanumeric symbol or other number or symbol used to uniquely identify the snapshot that is created by the storage device.

At block 506, the proxy client 204 receives the snapshot identifier from the storage device identifying the snapshot that has been created. At block 508, the proxy server transmits the relevant snapshot data to the client. The relevant snapshot data can include the snapshot identifier received from the storage device or additional information, such as time and date information or other information that can be used by the client to identify the snapshot that is created by the storage device and/or otherwise process the data.

Additional, fewer, or different blocks can be used to implement the process 500 without departing from the spirit or scope of the description. For example, the proxy client 204 can notify the storage manager directly that the snapshot has been created. In some embodiments, the proxy client 204 receives a notification that a snapshot has been created and generates the snapshot identifier for the client. In certain embodiments, the client generates the snapshot identifier and transmits it along with the snapshot request or after receiving the relevant data associated with the created snapshot.

Figure 6:
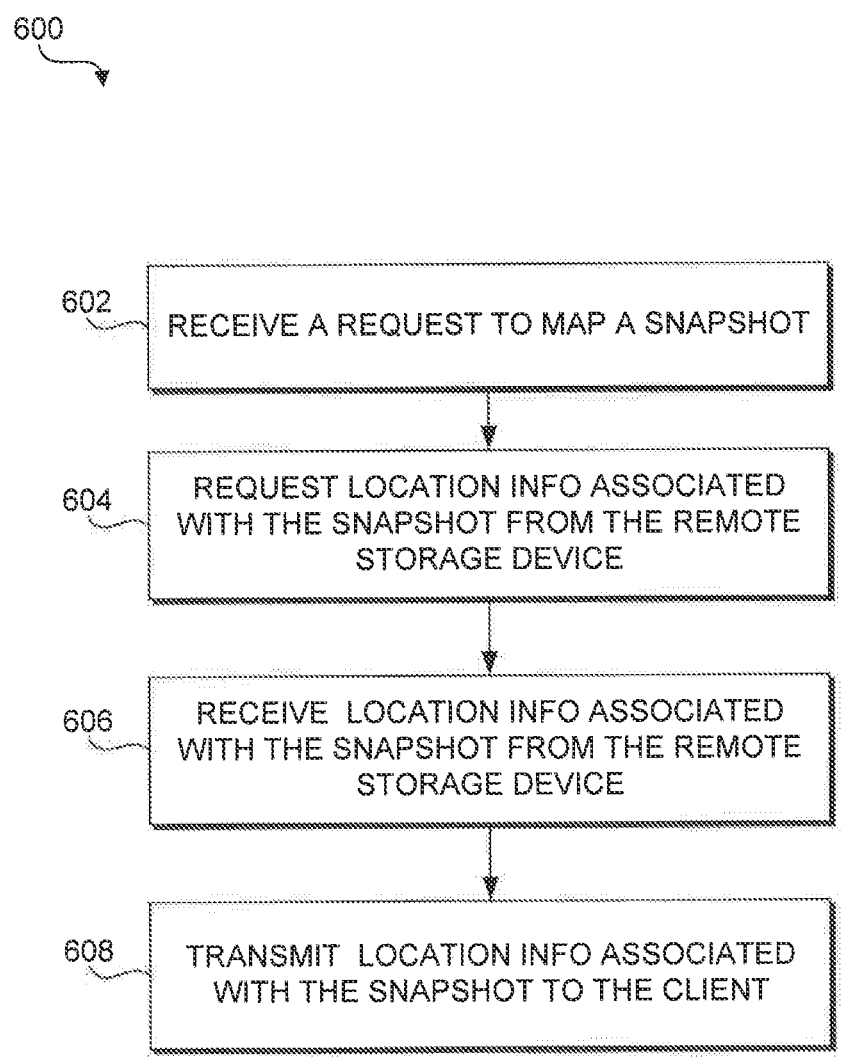

FIG. 6 is a flow diagram illustrative of an embodiment of a routine 600 implemented by a client proxy 204 for requesting a snapshot mount of a snapshot to be mounted to a client. One skilled in the relevant art will appreciate that the elements outlined for routine 600 can be implemented in one or more computing/components that are associated with the proxy client 204. Accordingly, routine 600 has been logically associated as being generally performed by the proxy client 204. However, the following illustrative embodiment should not be construed as limiting.

At block 602, the proxy client 204 receives a request to mount a particular snapshot to a client. The particular snapshot can be a snapshot that was previously created by a storage device 208. In some embodiments, the request can be a request to review or read from a previously created snapshot. The request can be received from a storage manager 202, a user, and/or directly from a client, such as virtual client 206, client 220, and/or virtual client 230.

At block 604, the proxy client 204 requests disk information (e.g., location information) of the particular snapshot that is to be mounted to the client from the storage device. The disk information requested can include a disk sector, array, partition, block, tape location, or other location information. In turn, the storage device can retrieve the location information and/or other disk data associated with the snapshot and transmit the location information and/or other disk data to the proxy client 204, as illustrated in block 606. As mentioned previously, the disk information can include location information as to the location within the data storage where the snapshot is located. Furthermore upon requesting the disk information associated with the snapshot from the storage device, the proxy client 204 can provide one or more snapshot identifiers to the storage device.

At block 608 the proxy client 204 transmits the disk information (e.g., location information) received from the storage device to the client. Additional, fewer, or different blocks can be used to implement the process 600 without departing from the spirit and scope of the description. For example, the client can use the disk information to mount the snapshot to itself and/or access the snapshot data. Furthermore, the client can notify the storage manager that the snapshot has been mounted. In addition, the client can unmount the snapshot as desired.

Figure 7:
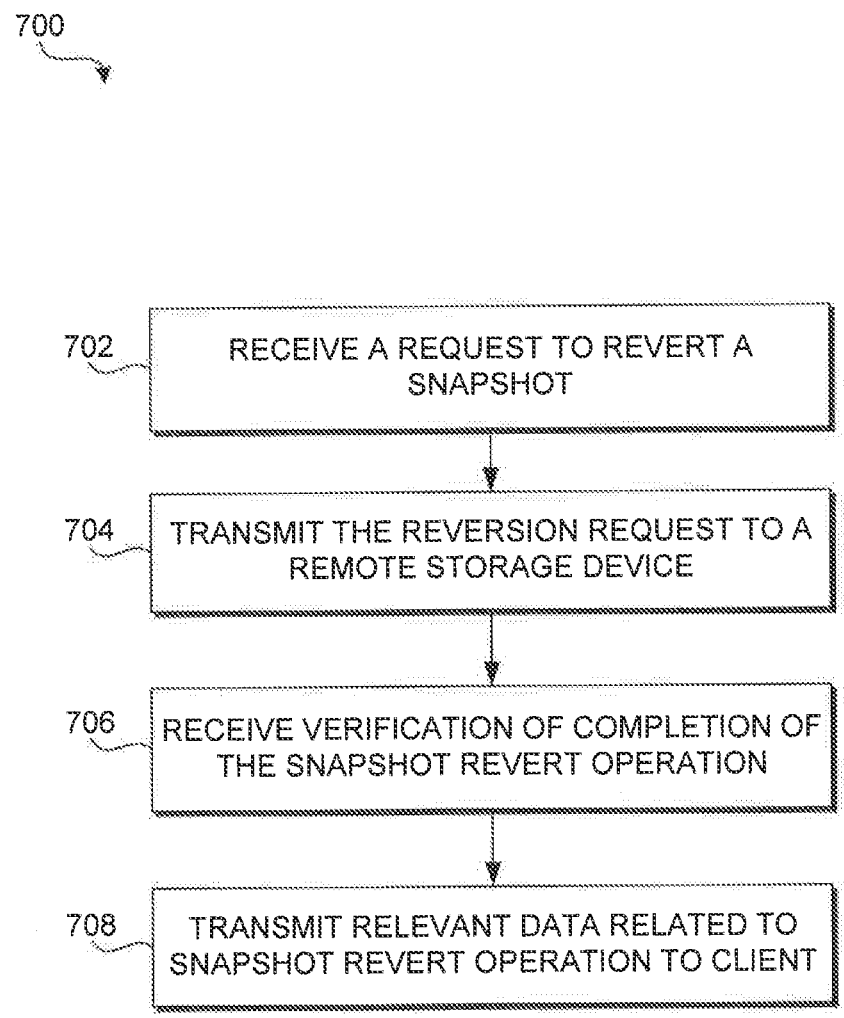

FIG. 7 is a flow diagram illustrative of an embodiment of routine 700 implemented by a client proxy for requesting a storage device to revert to a previous snapshot. One skilled in the relevant art will appreciate that the elements outlined for routine 700 can be implemented by one or more computing devices/components that are associated with the client proxy 204. Accordingly, routine 700 has been logically associated as being generally performed by the client proxy 204. However, the following illustrative embodiment should not be construed as limiting.

At block 702, the proxy server receives a reversion request. As mentioned previously the reversion request can be received from clients, such as the virtual client 206, client 220, and virtual client 230, the storage manager 202, other storage managers, users, computing devices, and the like. A reversion request can include the information regarding a specific snapshot that is to be used to revert the data in the storage device 208. For example, this reversion request can include an identifier of the specific snapshot that should be used for the reversion. The identifier can include location information, time and/or chronological information, and the like.

At block 704, the proxy client 204 transmits the reversion request to the storage device 208. Using the information received in the reversion request, the storage device 208 is reverts the data related to the client to a previous version. At block 706, the proxy client 204 receives verification from the storage device 208 that the data has been reverted.

At block 708, the proxy client 204 transmits relevant reversion data to the client 708. The relevant reversion data can include an identifier of the snapshot used for the reversion, as well as additional information concerning the new state of the data in the storage device 208, which snapshot was used, the date and time of the reversion, additional snapshots that may be used for additional reversions, and the like.

Additional, fewer or different blocks can be used to implement the process 700 without departing from the spirit and scope of the description. For example the client proxy can notify the storage manager 202 that the data has been reverted.

Example System Including Proxy Media Agent

Figure 8:
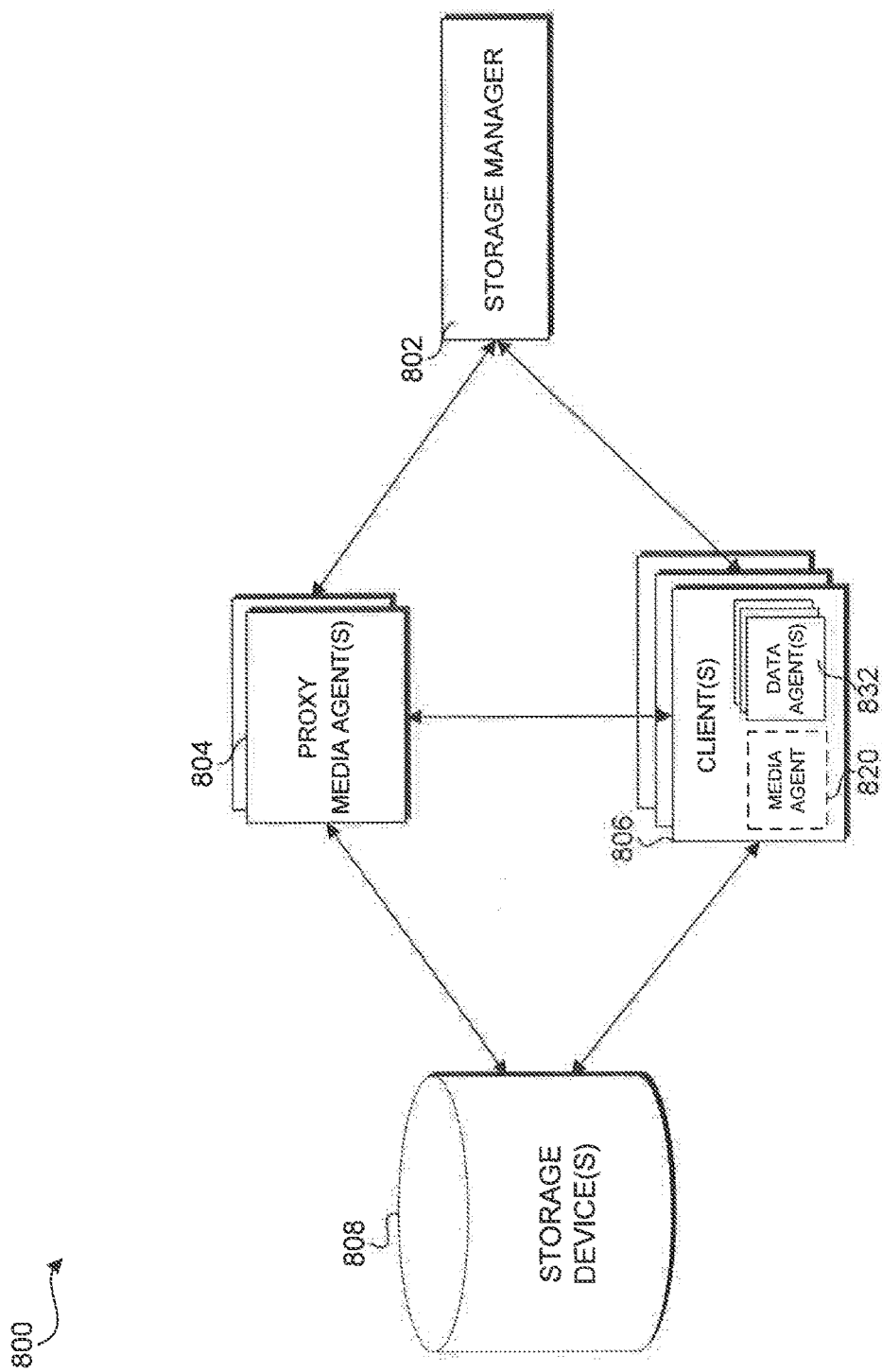
FIG. 8 is a block diagram illustrative of an embodiment of a storage network environment including a proxy media agent communicating with a storage device to carry out storage operations on client data.

FIG. 8 is a block diagram illustrative of an embodiments of a storage system 118, which includes a storage manager 802, one or more proxy media agents 804, one or more storage devices 808, and one or more clients 806. The components of the storage system 800 communicate with each other via any appropriate type of network, including wired or wireless networks including, but not limited to a SAN, LAN, WAN, the internet, etc.

Generally speaking, the components of system 118 can be similar to or the same as the similarly named components of FIG. 1A-1E. For example, the storage manager 802 can generally be configured to coordinate storage operations, and invoke the other modules to implement storage operations, (e.g., according to a storage policy) similar to the storage manager 140 of FIG. 1C. In the illustrated embodiment of FIG. 8, each client 806 includes an associated media agent 820 and one or more data agents 832. For instance, each client 806 may comprise a separate computing device having a media agent 820 and one or more data agents 832 installed thereon. It will be understood that additional media agents that are separate from the media agents 820 of the client can be included as part of the system 118. In addition, in some embodiments, the client computing devices 806 do not include a media agent residing thereon, but instead communicate and are associated with media agents installed on separate machines in an environment similar to the system 118 described above with reference to FIGS. 1D-1E.

The system 118 can include one or more proxy media agents 804, which can function similar to the media agents 144 as described above in FIGS. 1A-1E, and also communicate with the storage device 808 on behalf of other media agents 820/clients 806. In some embodiments, the proxy media agents 804 can be configured to authenticate with the storage device 808 and perform other control functionality for carrying out storage operations on the storage device 808. The storage device 808 can generally include any type of appropriate storage media, and in some embodiments comprises a storage device capable of performing hardware snapshots. As a few non-limiting examples, the storage device 808 can include any of the following storage array products: EMC Clariion, EMC Symmetrix, EMC Celerra, Dell EqualLogic, IBM XIV, NetApp FAS, and HP EVA, and HP 8PAR disk arrays.

In some cases, the media agents 820 can have direct access to the storage device 808 for performing certain functions, such as reading data from the storage device 808 or transmitting data to the storage device 808. However, in some embodiments, the media agent 820 relies on a proxy media agent 804 to perform control functions, including authentication with the storage device and/or initiation/management of certain storage operations (e.g., snapshots), for example. Thus, in certain embodiments, the proxy media agents 804 are used only for certain storage operations, such as snapshots, while other storage operations, such as read/write are performed by the media agent 820.

In some embodiments, the media agent 820 does not have direct control of the storage device 808, and instead communicates with the storage device 808 via the proxy media agent 804. For example, in some instances it is desirable to give a relatively few number of media agents direct access/control to the storage device 808, e.g., for performing certain storage operations (e.g., snapshots), such as where a security policy dictates such an arrangement. By providing a centralized point of access to the storage device 808 through the proxy media agent(s) 804, the data storage system can provide straightforward integration with a variety of storage devices 808.

Storage operations can include, but are not limited to, creating a snapshot of data associated with the client 806, mounting/unmounting a snapshot on the client 806, and/or reverting to a previous snapshot. In some embodiments, the storage manager 802 can transmit a snapshot creation command to the client 806. Using the data agent 832, the client 806 can send the appropriate snapshot data (e.g., information relating to the volume or other client data set to snap) to the media agent 820 for storage in the storage device 808. As the media agent 820 may not have control access to the storage device 808, the media agent 820 can forward the snapshot data to the proxy media agent 804. Upon receiving the snapshot data, the proxy media agent 804 requests that the storage device 808 perform the snapshot creation operation. Similarly, for other types of snapshot operations, the proxy media agent 804 can act as a centralized intermediary for interacting with the storage device 808. For instance, the media agent 820 can request the proxy media agent 804 to forward a request to retrieve a snapshot (e.g., for a mount operation, snapshot location information, and/or other snapshot information from the storage device 808, or can forward a request to revert a snapshot back to the client device 806. In some embodiments, the proxy media agent 804 authenticates with the storage device 808 and interacts with the storage device 808 for control purposes, but data is transmitted directly between the storage device 808 and the client 806, or between the storage device 808 and the media agent 820 associated with the client 806.

The storage device 808 receives the request and performs the desired storage operation. Upon completion of the storage operation, the storage device 808 transmits relevant information indicating that the storage operation has been completed to the proxy media agent 804, which forwards the information to the client 806 (e.g., to the media agent 820 associated with the client). In embodiments where the media agent 820 associated with the requesting client resides on a separate computing device it may forward the information received from the proxy media agent 804 to the client 806. As described in greater detail above, once the client 806 receives confirmation of the completion of the storage operation, the client 806 can notify the storage manager 802 that the storage operation has been completed, and/or perform one or more additional steps using the relevant data received. For example, the client 806 can use retrieved information to mount a snapshot from the storage device 808 to the client 806.

Figure 9:
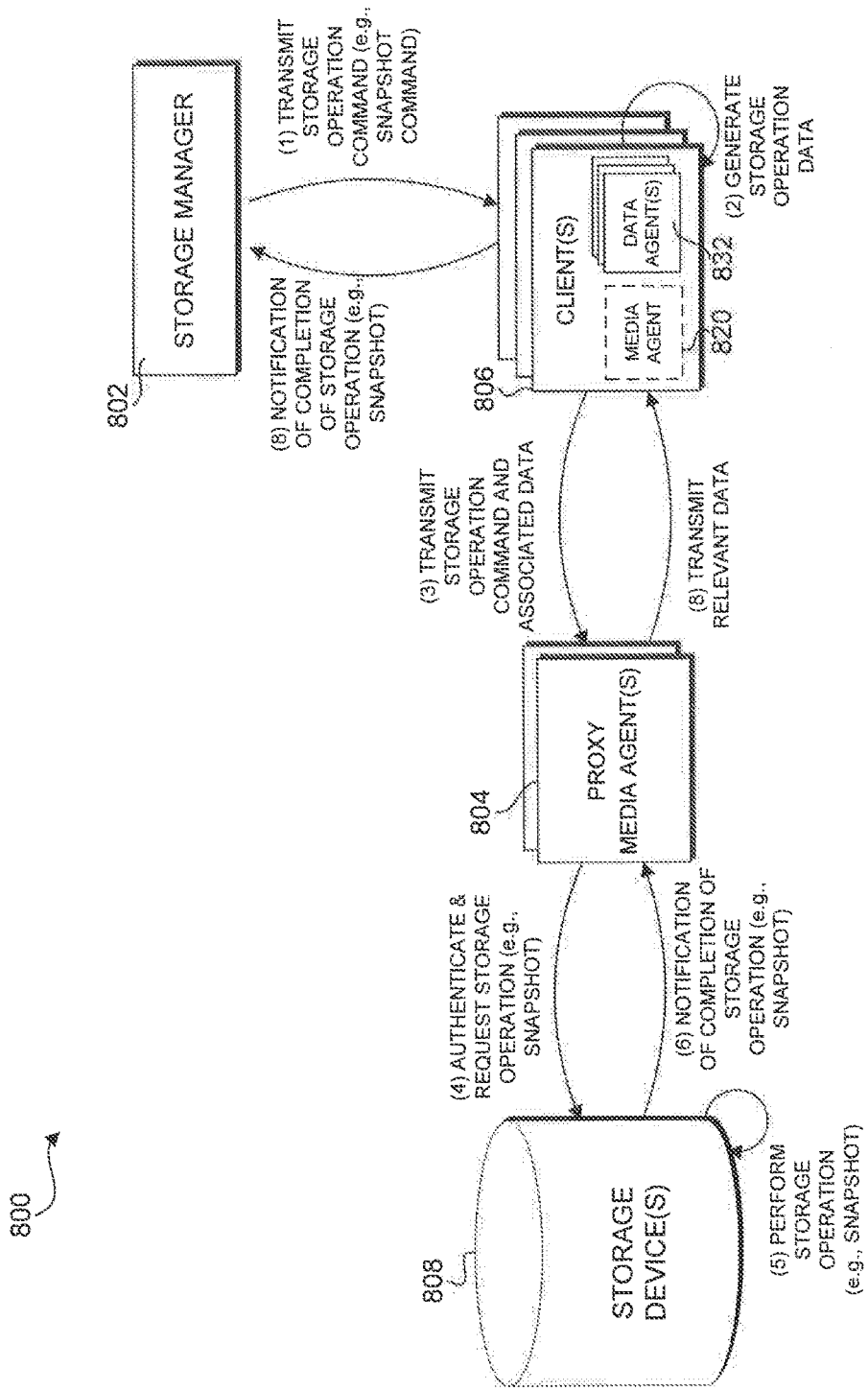
FIG. 9 is a state diagram illustrative of example interaction between the various components of the storage network environment of FIG. 8.

FIG. 9 is a state diagram illustrative of the interaction between the various components of the storage network environment 800 to perform a storage operation (e.g., to create a snapshot). As illustrated, the storage manager 802 (1) transmits a storage operation command to the client 806, such as to one of the data agents 832 residing on the client 806. As one example, the scheduled snapshot is of a particular database maintained by a database application running on the client 806. Thus, a corresponding database data agent 832 residing on the client 806 receives the snapshot creation request from the storage manager 802. The database data agent 832 may perform appropriate actions in conjunction with the snapshot operations, such as quiescing the database application during the snapshot operation in order to maintain data integrity. As mentioned previously, the storage operation command can include any number of different storage operations, such as a snapshot creation, mounting a previous snapshot, reversion to a previous snapshot, and the like. Upon receiving the command, the client 806 (2) generates the storage operation data. The storage operation data can include the information actual snapshot data, or identifiers of the snapshot data that is to be stored in the storage device 808. For example, the client 806 can perform a snapshot or other storage operation and/or generate data relevant to the storage operation that can be used and/or stored by the data storage device 808, such as location information, volume information, etc.

The client 806 (e.g., the media agent 820) determines that the proxy media agent 804 will be used and (3) transmits the storage operation request and associated data to the proxy media agent 804. For example, the client 806 (e.g., the media agent 820 associated with the client 806) may forward to the proxy media agent 804 an instruction to prepare for or store snapshot data, as well as other information associated with the snapshot (e.g., storage device identifier, an identifier or location information associated with the data set that is being snapped, storage device group, etc.). In addition, the data agents 832 can communicate with the media agent 820 to prepare the data for storage at the storage device 808.

Following receipt of the storage operation request and associated data, the proxy media agent 804 (4) authenticates with the storage device 808 and transmits the storage operation request to the storage device 808. To authenticate with the storage device 808, the proxy media agent 804 can maintain and transmit identifying information to the storage device 808, such as username and password information, or other identifiers. By authenticating with the storage device 808, the proxy media agent 804 can create a session for communicating with the storage device 808 and transmitting the storage operation data. In some embodiments, the proxy media agent 804 bundles storage operation data received from multiple clients prior to authenticating with the storage device.

Upon receiving the storage operation data, the storage device 808 (5) performs the requested storage operation. The requested storage operation may include storing the storage operation data, such as snapshot data, and/or opening a communication channel, such as a channel to communicate with the media agent 820 associated with the requesting client 806. In instances where a communication channel is opened, the storage device 808 can receive and store data from the media agent 820 or transmit data to the media agent 820 while the channel remains open. In this manner the proxy media agent 804 can be used for authentication and control purposes while allowing data to be transmitted between the storage device 808 and the client 806. Other communication mechanisms can be used as well.

Upon completion of the storage operation, the storage device 808 (6) notifies the proxy media agent 804 that the storage operation has been completed. In some embodiments, the notification indicates that a communication channel has been opened for communication between the storage device 808 and the media agent 820. In certain embodiments, the notification indicates that the storage device 808 has completed the storage operation (e.g., the snapshot is complete).

The proxy media agent 804 (7) transmits relevant data to the media agent 820, which is communicated to the client 806. The relevant data can include any and all information to be used by the client 806 to perform one or more operations, and to notify the storage manager 802 of completion or other status related to the requested storage operation. In some embodiments, the relevant data can include data specifically requested by the media agent 820 and/or data not requested by the media agent 820. Upon receiving the data from the proxy media agent 804, the client 806 (8) notifies the storage manager 802 that the storage operation has been completed, or otherwise updates the storage manager 802 regarding the status of the requested snapshot or other storage operation. Some or all of the steps described can be repeated. For example, steps (3)-(7) can be repeated to store additional data relating to one or more storage operations.

Figure 10:
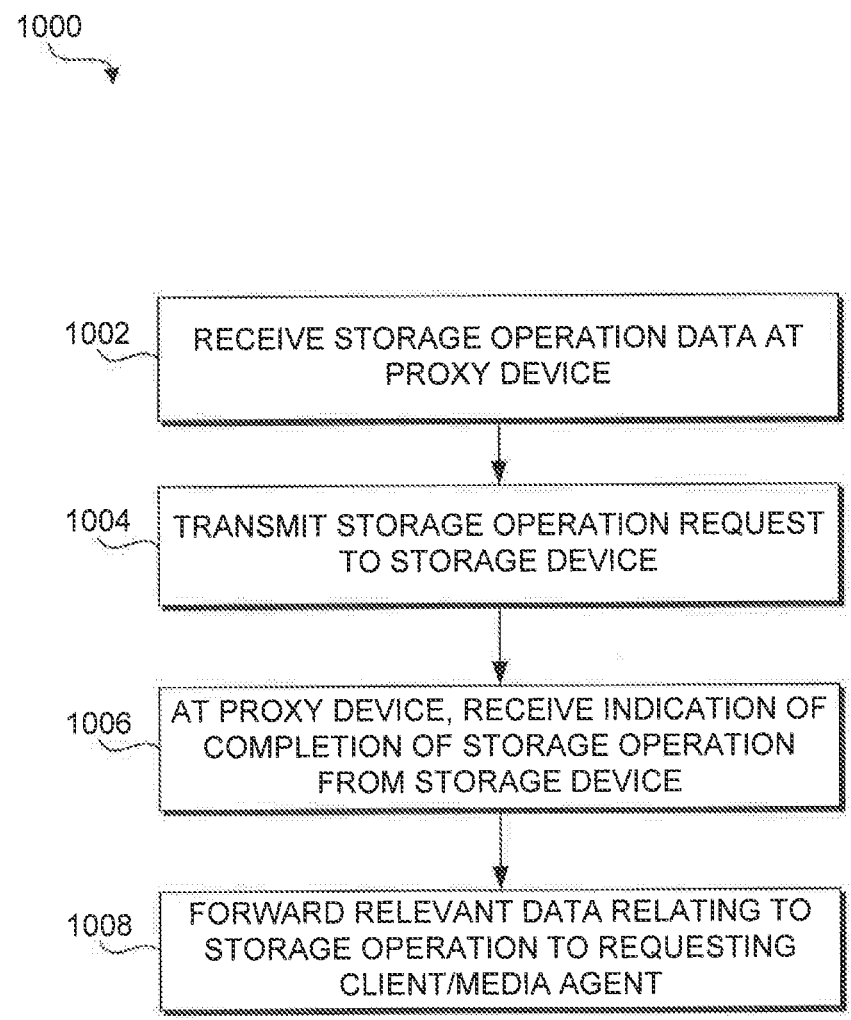
FIG. 10 is a flow diagram illustrative of embodiments of a routine implemented by a proxy media agent for requesting a storage device to perform one or more storage operations on client data.

FIG. 10 is a flow diagram illustrative of an embodiment of a routine implemented by a proxy media agent 804 for requesting a storage device 808 to perform one or more storage operations. One skilled in the relevant art will appreciate that the elements outlined for routine 1000 can be implemented by one or more computing devices/components that are associated with the proxy media agent 804. Accordingly, routine 1000 has been logically associated as being generally performed by the proxy media agent 804. However, the following illustrative embodiment should not be construed as limiting.

At block 1002, the proxy media agent 804 receives storage operation data from a media agent 820 on behalf of a client 806. The storage operation data can include a request to perform, or have performed, one or more storage operations, and or include data that is to be stored on the storage device 808. For example the storage operation request can include, but is not limited to, any one or more of a snapshot creation, snapshot mount, and/or a reversion to a previous snapshot. The storage operation request can be received at regular intervals as determined by a storage policy, and, depending on the embodiment, can be received by the proxy media agent 804 from the media agent 820, the client 806, the storage manager 802, some other computing device via wired or wireless communication protocols. In some embodiments, the media agent 820 associated with the requesting client device 806 and its associated media agent 820 do not have direct access to the storage device 808. For instance, in certain embodiments, the media agents 820 have only limited access to the storage device 808, such as a direct data connection, but do not have the ability to control and access the storage device 808 for requesting certain storage operations. For example, the media agents 820 may be unable to authenticate with a storage device 808 and/or initiate hardware snapshot operations without the intervention of the proxy media agent 804.

At block 1004, the proxy media agent 804 transmits a storage operation request to the storage device 808. As mentioned previously, the storage operation request can include a request to store to or retrieve data from the storage device 808 and/or request that a communication channel be opened for communication between the media agent 820 and the storage device 808. The storage device 808 can include one or more disk arrays (e.g., hardware snapshot-capable disk arrays) storing data related to the client 806, and can include any of the storage devices 808 described herein.

At block 1006, the proxy media agent 804 receives an indication of the completion of the storage operation from the storage device. The indication can include various pieces of information that can be used to verify that the storage operation has been completed. For example, depending on the type of storage operation, the indication can include a snapshot identifier for a newly created snapshot, a snapshot disk identifier when a snapshot is to be mounted to a client, and/or some other identifier when other storage operations are used. In certain embodiments, the indication includes information regarding a communication channel to allow the media agent 806 to communicate with the storage device 808 and send/receive data from the storage device 808.

At block 1008, the proxy media agent 804 transmits relevant data to the client. The relevant data can include any one or more identifiers received from the storage device that can be used by the client to verify that the storage operation has completed successfully. Furthermore the relevant data can include additional information that can be used by the client to perform additional processes based on the identifiers received from the proxy media agent 804.

Additional, fewer, or different blocks can be used to implement the process 1000 without departing from the spirit and scope of the description. For example, in some embodiments the client can perform one or more processes using the relevant data received from the proxy media agent. Furthermore, although not illustrated, the storage manager can transmit a storage operation command to the client, which in turn can transmit a storage operation request to the proxy media agent.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method for performing a storage operation using a proxy secondary storage computing device, the method comprising:
   receiving at a first computing device a first request to perform a first snapshot operation, the first snapshot operation to be performed on a first data set associated with one or more software applications executing on a second computing device,
   wherein the first computing device and the second computing device form part of a networked storage system comprising at least one storage device that is capable of performing snapshot operations;
   forwarding, using the first computing device, the first request to the storage device, wherein the storage device performs the first snapshot operation on the first data set in response to receipt of the first request;
   receiving, at the first computing device, a first identifier associated with the snapshot operation; and
   forwarding the first identifier to the second computing device.

2. The method of claim 1, wherein the second computing device communicates directly with the storage device for a first set of one or more types of storage operations and communicates with the storage device via the first computing device for a second set of one or more types of storage operations.

3. The method of claim 2, wherein the first set includes data read operations and the second set includes one or more snapshot operations.

4. The method of claim 1, wherein the second computing device is not in direct communication with the storage device and is only in indirect communication with the storage device via the first computing device.

5. The method of claim 1, wherein the second computing device does not have direct access to the storage device and only indirectly accesses the storage device via the first computing device.

6. The method of claim 1, wherein the first computing device authenticates with the storage device prior to forwarding the first request to the storage device.

7. A data storage system, comprising:
   a storage device configured to perform snapshot operations; and
   a first computing device in communication with a second computing device and the storage device, wherein the first computing device is configured to:
   receive a first request to perform a first snapshot operation, the first snapshot operation to be performed on a first data set associated with one or more software applications executing on the second computing device,
   forward the first request to the storage device, wherein the storage device performs the first snapshot operation on the first data set in response to receipt of the first request,
   receive a first identifier associated with the first snapshot operation, and
   forward the first identifier to the second computing device.

8. The system of claim 7, wherein the second computing device is configured to communicate directly with the storage device for a first set of one or more storage operations and communicate with the storage device via the first computing device for a second set of one or more storage operations.

9. The system of claim 8, wherein the first set includes reading data from the storage device and the second set includes one or more snapshot operations.

10. The system of claim 7, wherein the second computing device is not in direct communication with the storage device and is only in indirect communication with the storage device via the first computing device.

11. The system of claim 7, wherein the second computing device does not have direct access to the storage device and only indirectly accesses the storage device via the first computing device.

12. The system of claim 7, wherein the first computing device is further configured to receive snapshot operation requests from a plurality of other computing devices and forward the snapshot operation requests to the storage device.

13. The system of claim 12, wherein the first computing device authenticates with the storage device prior to forwarding the snapshot operation requests.

* * * * *